(12) United States Patent
Yukinobu et al.

(10) Patent No.: US 8,963,146 B2
(45) Date of Patent: Feb. 24, 2015

(54) METHOD OF MANUFACTURING TRANSPARENT CONDUCTIVE FILM, THE TRANSPARENT CONDUCTIVE SUBSTRATE USING THE FILM, AS WELL AS DEVICE USING THE SUBSTRATE

(75) Inventors: Masaya Yukinobu, Ichikawa (JP); Yuki Murayama, Ichikawa (JP); Takahito Nagano, Ichikawa (JP); Yoshihiro Otsuka, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 13/261,283

(22) PCT Filed: Nov. 5, 2010

(86) PCT No.: PCT/JP2010/070165
§ 371 (c)(1),
(2), (4) Date: May 3, 2012

(87) PCT Pub. No.: WO2011/055856
PCT Pub. Date: May 12, 2011

(65) Prior Publication Data
US 2012/0223302 A1    Sep. 6, 2012

(30) Foreign Application Priority Data

Nov. 5, 2009 (JP) ................................. 2009-254468
Jun. 9, 2010 (JP) ................................. 2010-132473

(51) Int. Cl.
*H01L 29/10*     (2006.01)
*C09D 5/24*     (2006.01)
(Continued)

(52) U.S. Cl.
CPC .. *C09D 5/24* (2013.01); *C09D 1/00* (2013.01); *C23C 18/14* (2013.01)
USPC ................. 257/43; 438/108; 117/68; 117/70; 257/57

(58) Field of Classification Search
USPC ............ 438/104, 778; 257/43, 59; 117/68–70
See application file for complete search history.

(56) References Cited

U.S. PATENT DOCUMENTS

| 4,369,208 A | 1/1983 | Okunaka et al. |
| 4,420,500 A | 12/1983 | Nakatani et al. |

(Continued)

FOREIGN PATENT DOCUMENTS

| JP | 57-36714 | 2/1982 |
| JP | 57-138708 | 8/1982 |

(Continued)

OTHER PUBLICATIONS

K. Nomura et al.—Nature, 2004, vol. 432, pp. 488-492.

*Primary Examiner* — Cheung Lee
*Assistant Examiner* — Frederick B Hargrove
(74) *Attorney, Agent, or Firm* — Gerald E. Hespos; Michael J. Porco; Matthew T. Hespos

(57) ABSTRACT

By using a coating method, which is a method of manufacturing a transparent conductive film, with low-temperature heating lower than 300° C., a transparent conductive film with excellent transparency, conductivity, film strength, and resistance stability and a method of manufacturing this film are provided. In the method of manufacturing a transparent conductive film, a heat energy ray irradiating step is a step of irradiating with the energy rays while heating under an oxygen-containing atmosphere to a heating temperature lower than 300° C. to form the inorganic film, and the plasma processing step is a step of performing the plasma processing on the inorganic film under a non-oxidizing gas atmosphere at a substrate temperature lower than 300° C. to promote mineralization or crystallization of the film, thereby forming a conductive oxide fine-particle layer densely packed with conductive oxide fine particles having a metal oxide as a main component.

21 Claims, 17 Drawing Sheets
(4 of 17 Drawing Sheet(s) Filed in Color)

(51) Int. Cl.
*C09D 1/00* (2006.01)
*C23C 18/14* (2006.01)

(56) References Cited

U.S. PATENT DOCUMENTS

| | | | |
|---|---|---|---|
| 4,450,100 | A | 5/1984 | Kano et al. |
| 4,460,496 | A | 7/1984 | Kano et al. |
| 7,132,373 | B2 * | 11/2006 | Fukuhisa et al. ............... 438/778 |
| 7,906,780 | B2 * | 3/2011 | Iwasaki ............................ 257/59 |
| 2002/0087018 | A1 * | 7/2002 | Celinska et al. ............... 556/105 |
| 2009/0294765 | A1 * | 12/2009 | Tanaka et al. ................... 257/43 |
| 2010/0210069 | A1 * | 8/2010 | Seon et al. ....................... 438/104 |

FOREIGN PATENT DOCUMENTS

| | | |
|---|---|---|
| JP | 57-212268 | 12/1982 |
| JP | 60-19610 | 5/1985 |
| JP | 61-26679 | 2/1986 |
| JP | 63-19046 | 4/1988 |
| JP | 63-25448 | 5/1988 |
| JP | 63-314714 | 12/1988 |
| JP | 2-20706 | 5/1990 |
| JP | 4-255768 | 9/1992 |
| JP | 6-203658 | 7/1994 |
| JP | 6-325637 | 11/1994 |
| JP | 11-60278 | 3/1999 |
| JP | 2001-106567 | 4/2001 |
| JP | 2001-244464 | 9/2001 |
| JP | 2002-76356 | 3/2002 |
| JP | 2003-308893 | 10/2003 |
| JP | 2007-123698 | 5/2007 |
| JP | 2007-123699 | 5/2007 |
| JP | 2007-123700 | 5/2007 |
| JP | 2007-201366 | 8/2007 |

* cited by examiner

METHOD OF MANUFACTURING TRANSPARENT CONDUCTIVE FILM, THE TRANSPARENT CONDUCTIVE SUBSTRATE USING THE FILM, AS WELL AS DEVICE USING THE SUBSTRATE

BACKGROUND OF THE INVENTION

1. Field of the Invention

The present invention relates to a transparent conductive film and a method of manufacturing the transparent conductive film.

2. Description of the Related Art

In detail, the present invention relates to a method of manufacturing a transparent conductive film formed on a heat-resistant inorganic substrate made of such as glass or ceramic, or a resin substrate made of such as a plastic film by using a coating method (a wet coating method) with heating at a low temperature lower than 300° C., in particular, at 100° C. to 250° C., the transparent conductive film having both of excellent transparency and high conductivity and also being excellent in film strength and resistance stability, and to the transparent conductive film obtained by the method of manufacturing the transparent conductive film. Furthermore, the present invention relates to an element and a transparent conductive substrate using the transparent conductive film, and to a device using the transparent conductive substrate.

As a material for forming a transparent conductive film for use in a transparent electrode for a display element such as a liquid-crystal display, electroluminescent display and a plasma display, in a touch panel, in a transparent electrode such as a solar panel, or for functional coating for such as reflecting heat rays, shielding electromagnetic waves, preventing charging and defogging, a tin-doped indium oxide (Indium Tin Oxide, which may be hereinafter referred to as "ITO"), which is a conductive oxide, is known.

As methods of manufacturing this transparent conductive film made of ITO (ITO film), physical methodologies are widely used, such as a vacuum deposition method, a sputtering method, and a chemical vapor deposition method. By these methods, a uniform ITO transparent conductive film being excellent in transparency and conductivity can be formed on a substrate.

However, a film forming apparatus to be used in these methods takes a vacuum container as a base, which is very expensive. Also, the component gas pressure in the manufacturing apparatus is required to be precisely controlled for each substrate film formation, thereby posing a problem in manufacturing cost and mass producibility.

As a manufacturing method to solve these problems, a method has been studied in which a coating liquid for forming transparent conductive film obtained by dissolving an indium compound and a tin compound in a solvent is used for coating a substrate (this method may be hereinafter referred to as a "coating method" or a "wet coating method").

In this coating method, a transparent conductive film (ITO film) is formed with a simple manufacturing process of coating of a substrate with the coating liquid for forming transparent conductive film, drying, and baking. Known methods of coating of the substrate with the coating liquid include an inkjet printing method, a screen printing method, a gravure printing method, an offset printing method, a flexor printing method, a dispenser printing method, a slit coat method, a die coat method, a doctor blade coat method, a wire bar coat method, a spin coat method, a dip coat method, and a spray coat method.

As coating liquids for use in these coating methods, various coating liquids containing an indium compound and a tin compound have been conventionally developed. For example, a mixture of indium nitrate and alkyl tin nitrate containing halogen ions or a carboxyl group (for example, refer to Japanese Unexamined Patent Application Publication No. 57-138708), a mixture of an organic indium compound and an organic tin compound containing an alkoxyl group or the like (for example, refer to Japanese Unexamined Patent Application Publication No. 61-26679), a mixture of indium nitrate and an organic tin compound (for example, refer to Japanese Unexamined Patent Application Publication No. 4-255768), an inorganic compound mixture of indium nitrate, tin nitrate, and others (for example, refer to Japanese Unexamined Patent Application Publication No. 57-36714), a mixture of an organic indium nitrate such as dicarboxylate indium nitrate and an organic tin nitrate such as alkyl tin nitrate (for example, refer to Japanese Unexamined Patent Application Publication No. 57-212268), and an organic compound mixture solution made of an organic indium complex and a tin complex with coordination of acetylacetone (for example, refer to Japanese Examined Patent Application Publication No. 63-25448, Japanese Examined Patent Application Publication No. 2-20706, and Japanese Examined Patent Application Publication No. 63-19046) are disclosed.

In most of these conventionally-known coating liquids, a nitrate of indium or tin, an organic or inorganic compound made of a halide, an organometallic compound such as a metal alkoxide, and others are used.

However, since the coating liquid using a nitrate or a halide generates corrosive gas such as a nitrogen oxide or chlorine at the time of baking, there is a problem of causing corrosion of facilities and environmental pollution. As for the coating liquid using a metal alkoxide, the material is prone to hydrolytic degradation, thereby posing a problem in stability of the coating liquid. Moreover, most of the coating liquids using an organometallic compound described in the patent documents described above has poor wettability with respect to a substrate, and there is also a problem in which a non-uniform film tends to be formed.

To get around this, as an improved coating liquid with these problems mitigated, a coating liquid for forming transparent conductive film containing indium acetylacetonate (standard nomenclature: tris(acetylacetonato)indium: In($C_5H_7O_2$)3), tin acetylacetonate (standard nomenclature: di-n-butyl bis(2, 4-pentanedionato) tin: [Sn($C_4H_9$)2($C_5H_7O_2$)2]), hydroxypropylcellulose, alkylphenol and/or alkenylphenol, and dibasic acid ester and/or benzyl acetate is disclosed (for example, refer to Japanese Unexamined Patent Application Publication No. 6-203658).

In this coating liquid, with hydroxypropylcellulose being contained in a mixture solution of indium acetylacetonate and tin acetylacetonate, wettability of the coating liquid with respect to the substrate is improved. At the same time, the viscosity of the coating liquid is adjusted based on the content of hydroxypropylcellulose, which is a viscosity-adjusting agent, thereby making it possible to adopt various coating methods such as spin coating, spray coating, dip coating, screen printing, and wire bar coating.

Also, as an improved coating liquid for spin coating, a coating liquid for forming transparent conductive film is suggested (for example, refer to Japanese Unexamined Patent Application Publication No. 6-325637) containing an organic indium compound such as indium acetylacetonate or indium octylate, an organic tin such as tin acetylacetonate or tin octylate, and an organic solvent, in which as the organic solvent, an acetylacetone solution with alkylphenol and/or alkenylphenol dissolved therein or the acetylacetone solution with alkylphenol and/or alkenylphenol dissolved therein being diluted with alcohol is used.

This coating liquid has a low viscosity, and can be used not only in spin coating but also spray coating and dip coating.

Furthermore, for the purpose of improving performance of a transparent conductive film to be obtained, irradiation of ultraviolet rays has been tried to be combined with a simple film forming process of coating of a substrate with a coating liquid for forming transparent conductive film, drying, and baking. Examples of methods suggested include a method (refer to Japanese Examined Patent Application Publication No. 60-19610) in which at the time of coating with a coating liquid for forming transparent conductive film, the film is irradiated with ultraviolet rays from a high-pressure mercury lamp or a metal halide lamp to obtain a uniform and dense dried coating film and then the dried coating film is baked at a high temperature on the order of 500° C. and a method (refer to Japanese Unexamined Patent Application Publication No. 63-314714) in which the transparent conductive film obtained by baking at a high temperature equal to or higher than 500° C. (thermal decomposition) is irradiated with ultraviolet rays.

However, even with these methods, the resistance of the film is not sufficiently decreased. Also, the resistance once decreased with irradiation of the transparent conductive film obtained by baking with ultraviolet rays tends to be increased again due to storage in the atmosphere.

Thus, in order to obtain a transparent conductive film with low resistance and excellent in resistance stability, a method is suggested (refer to Japanese Unexamined Patent Application Publication No. 11-60278) in which a substrate is coated with a coating liquid for forming transparent conductive film containing an indium compound and a tin compound, then, during or after drying by preliminary heating at a temperature equal to or lower than 300° C., irradiation with ultraviolet rays having a wavelength equal to or smaller than 200 nm using, for example, a low-pressure mercury lamp is performed, and baking is further performed at a temperature equal to or higher than 300° C. (preferably, equal to or higher than 400° C.) under a non-oxidizing atmosphere.

Also a method is disclosed (refer to Japanese Unexamined Patent Application Publication No. 2001-106567) in which after a transparent substrate is coated with a coating liquid for forming transparent conductive film and is dried, it is baked in an oxygen atmosphere and is further baked in vacuum to obtain a transparent conductive film. According to this, by baking in the oxygen atmosphere, the baking temperature can be decreased to 180° C. Also, with irradiation with ultraviolet rays of a mercury lamp during baking in the oxygen atmosphere, decrease in resistance can be achieved. However, the wavelength of ultraviolet rays indicated by "ultraviolet rays of the mercury lamp" is not clear. Moreover, grounds for allowing the baking temperature to be decreased to 180° C. or specific examples are not shown. In addition, film characteristics (transmittance and resistance value) of the transparent conductive film obtained at the baking temperature of 180° C. are not described at all.

Therefore, this method seems to have a problem in actual use and also have many problems in practicability.

Still further, as a method of obtaining a metal oxide fine-particle film made of TiO2 fine particles, ITO fine particles, or the like with heating at a low temperature, a method is suggested (refer to Japanese Unexamined Patent Application Publication No. 2003-308893) in which plasma processing is performed on a metal oxide fine-particle containing coating layer obtained by coating a substrate with a coating liquid containing metal oxide fine particles and a binder and drying, thereby removing the binder.

However, this method has an object of obtaining a porous film with a large porosity by using fine particles already becoming a metal oxide as a filler of the coating liquid, and does not aim at forming a dense film to achieve an improvement in characteristics such as transparency, conductivity, film strength, and resistance stability of the transparent conductive film.

Meanwhile, a conductive oxide film having a conductive oxide such as indium oxide as a main component has been used for a transparent electrode typified by the ITO film described above, and additionally in recent years, has attracted attention as a channel active layer of a thin-film transistor and has been actively studied.

As a channel active layer of a field-effect thin-film transistor (TFT), a thin film made of amorphous silicon or the like formed on a glass substrate has been generally used so far. However, amorphous silicon has a low carrier mobility and does not sufficiently have characteristics as a thin-film transistor element.

Thus, many suggestions have been made in which various conductive oxide films are used as a channel active layer to improve the characteristics of a thin-film transistor element. Disclosed examples include a transparent thin-film transistor in which a transparent conductive oxide polycrystalline thin film using ZnO as a main component is used as a channel layer (refer to Japanese Unexamined Patent Application Publication No. 2002-76356 and Japanese Unexamined Patent Application Publication No. 2001-244464), a thin-film transistor in which an In—Ga—Zn—O-based transparent amorphous oxide semiconductor film (a-IGZO) is used as a channel active layer (refer to K. Nomura et. al., Nature, 2004, Vol. 432, pp. 488-492), a thin-film transistor in which a Ga—Zn—O-based or Ga—Sn—O-based non-monocrystalline oxide semiconductor is used as an active layer (refer to Japanese Unexamined Patent Application Publication No. 2007-123698), a thin-film transistor in which an In—Ga—Zn—O-based (InGaZnO4) non-monocrystalline oxide semiconductor is used as a channel active layer (refer to Japanese Unexamined Patent Application Publication No. 2007-123700), a thin-film transistor in which an In—Ga—Zn—Sn—O-based (InGaZnO4 doped with Sn) non-monocrystalline oxide semiconductor is used as a channel active layer (refer to Japanese Unexamined Patent Application Publication No. 2007-123699), and a thin-film transistor in which an amorphous oxide semiconductor made of any one or more of ZnO, SnO2, and In2O3 is used as a channel active layer (refer to Japanese Unexamined Patent Application Publication No. 2007-201366).

However, the conductive oxide films in the thin-film transistors described above (refer to Japanese Unexamined Patent Application Publication No. 2002-76356, No. 2007-123698, No. 2007-123700, No. 2007-123699, No. 2007-201366, and K. Nomura et. al., Nature, 2004, Vol. 432, pp. 488-492) are all formed by using a vapor phase method such as a sputtering method, a pulsed laser deposition method (a PLD method), or an electron beam deposition method, and not by using a coating method.

Moreover, in Japanese Unexamined Patent Application Publication No. 2001-244464, a coating liquid with zinc acetate being suspended in isopropanol is used to form a channel active layer made of ZnO, and after coating with the coating liquid, baking at a high temperature of 600° C. to 900° C. in air or in an oxygen atmosphere is required.

As described above, it is difficult to obtain a high-quality conductive oxide film (an oxide semiconductor film) suitable for a channel active layer of a thin-film transistor with a coating method using baking at a low temperature lower than 300° C.

SUMMARY OF THE INVENTION

However, most of the methods of manufacturing a transparent conductive film to be formed by coating a substrate with any of various coating liquids for transparent conductive film formation, drying, and baking require baking at a high temperature (for example, a temperature equal to or higher than 400° C.) after coating with the coating liquid for forming transparent conductive film and drying, and do not allow a transparent conductive film having excellent film characteristics to be obtained with a heating process at a low temperature lower than 300° C., in particular, 100° C. to 250° C. Also, even in the method in which a transparent conductive film can be obtained with baking at a low temperature lower than 300° C., baking in an oxygen atmosphere is required, thereby posing a problem of a large restriction on a heating apparatus also in view of a material. At the same time, there are doubts in actual use, and many problems in practicability can be assumed.

Therefore, in order to use the coating liquid for forming transparent conductive film described above to form a transparent electrode in various devices only allowing heating at a low temperature (lower than 300° C., in particular, 100° C. to 250° C.) in manufacturing process, for example, a liquid-crystal display or a touch panel, a method is desired in which a transparent conductive film excellent in transparency and conductivity is formed with a heating process at a low temperature lower than 300° C., in particular, 100° C. to 250° C. Similarly, in order to use the coating liquid for forming transparent conductive film described above to form a conductive oxide film (an oxide semiconductor film) as a channel active layer of a thin-film transistor element, a method is desired in which a transparent conductive film (an oxide semiconductor film) with a high density is formed with a heating process at a low temperature lower than 300° C.

An object of the present invention is to provide a transparent conductive film to be formed by using an ink coating method, which is a transparent conductive film manufacturing method at low cost with a simple manner, with heating at a low temperature lower than 300° C., in particular, 100° C. to 250° C., the transparent conductive film having both of excellent transparency and high conductivity and also being excellent in film strength and resistance stability; a method of manufacturing this transparent conductive film and the transparent conductive film obtained by the method; an element using the same; and a transparent conductive substrate and a device using the same.

In view of these problems, as a result of diligent studies about a method of manufacturing a transparent conductive film having any one or more of indium oxide, tin oxide, and zinc oxide as a main component to be obtained by coating a substrate with a coating liquid for forming transparent conductive film containing any one or more of an organic indium compound, an organic tin compound, and an organic zinc compound as a main component, drying, and heating, the inventors made an invention in which when the dried coating film after coating and drying is subjected to energy ray irradiation while being heated under an oxygen-containing atmosphere and to plasma processing under a non-oxidizing gas atmosphere, decomposition and burning occur in the dried coating film even at a low heating temperature (substrate temperature) lower than 300° C., in particular, 100° C. to 250° C., to promote mineralization and crystallization of the film, thereby obtaining a film structure of a conductive oxide fine-particle layer densely packed with conductive oxide fine particles and obtaining a transparent conductive film having both of excellent transparency and high conductivity and also being excellent in film strength and resistance stability.

That is, a first aspect of the present invention is directed to a method of manufacturing a transparent conductive film to be formed through following steps: a coating step of coating a substrate with a coating liquid for forming transparent conductive film containing an organometallic compound as a main component to form a coating film; a drying step of drying the coating film to form a dried coating film; a heat energy ray irradiating step of irradiating the dried coating film with energy rays while heating the dried coating film to form an inorganic film having an inorganic component, which is a metal oxide, as a main component; and a plasma processing step of performing plasma processing on the inorganic film to further promote mineralization or crystallization of the film, wherein the heat energy ray irradiating step is a step of irradiating the dried coating film having the organometallic compound as the main component formed in the drying step with the energy rays while heating the dried coating film under an oxygen-containing atmosphere to a heating temperature lower than 300° C. to remove an organic component contained in the dried coating film by decomposition or burning, or decomposition and burning and to form the inorganic film having the inorganic component, which is the metal oxide, as the main component, the plasma processing step is a step of performing the plasma processing on the inorganic film having the inorganic component, which is the metal oxide, as the main component formed in the heat energy ray irradiating step under a non-oxidizing gas atmosphere at a substrate temperature lower than 300° C. to further promote mineralization or crystallization of the film, thereby forming a conductive oxide fine-particle layer densely packed with conductive oxide fine particles having the metal oxide as a main component and, furthermore, the organometallic compound is formed from any one or more of an organic indium compound, an organic tin compound, and an organic zinc compound, and the metal oxide is any one or more of indium oxide, tin oxide, and zinc oxide.

A second aspect of the present invention is directed to a method of manufacturing a transparent conductive film to be formed through a coating step of coating a substrate with a coating liquid for forming transparent conductive film containing an organometallic compound and a dopant organometallic compound as main components to form a coating film; a drying step of drying the coating film to form a dried coating film; a heat energy ray irradiating step of irradiating the dried coating film with energy rays while heating the dried coating film to form an inorganic film having an inorganic component, which is a metal oxide containing a dopant metal compound, as a main component; and a plasma processing step of performing plasma processing on the inorganic film to further promote mineralization or crystallization of the film, wherein the heat energy ray irradiating step is a step of irradiating the dried coating film having the organometallic compound and the dopant organometallic compound as main components formed in the drying step with the energy rays while heating the dried coating film under an oxygen-containing atmosphere to a heating temperature lower than 300° C. to remove an organic component contained in the dried coating film by decomposition or burning, or decomposition and burning and to form the inorganic film having the inorganic component, which is the metal oxide containing the dopant metal compound, as the main component, the plasma processing step is a step of performing the plasma processing on the inorganic film having the inorganic component, which is the metal oxide containing the dopant metal compound, as the main component formed in the heat energy ray irradiating step under a non-oxidizing gas atmosphere at a substrate temperature lower than 300° C. to further promote mineralization or crystallization of the film, thereby forming a conductive oxide fine-particle layer densely packed with conductive oxide fine particles containing the dopant metal compound and having the metal oxide as a main component and, furthermore, the organometallic compound is formed from any one or more of an organic indium compound, an organic tin compound, and an organic zinc compound, and the metal oxide is any one or more of indium oxide, tin oxide, and zinc oxide.

A third aspect of the present invention is directed to the method of manufacturing the transparent conductive film according to the second aspect, wherein a content ratio between the organometallic compound and the dopant organometallic compound is in a range of 99.9:0.1 to 66.7:33.3 in terms of a molar ratio of the organometallic compound:the dopant organometallic compound.

A fourth aspect of the present invention is directed to the method of manufacturing the transparent conductive film according to the second or third aspect, wherein the organometallic compound is made of an organic indium compound, and the dopant organometallic compound is any one or more of an organic tin compound, an organic titanium compound, an organic germanium compound, an organic zinc compound, an organic tungsten compound, an organic zirconium compound, an organic tantalum compound, an organic niobium compound, an organic hafnium compound, and an organic vanadium compound, and the dopant metal compound is any one or more of tin oxide, titanium oxide, germanium oxide, zinc oxide, tungsten oxide, zirconium oxide, tantalum oxide, niobium oxide, hafnium oxide, and vanadium oxide.

A fifth aspect of the present invention is directed to the method of manufacturing the transparent conductive film according to the second or third aspect, wherein the organometallic compound is made of an organic tin compound, and the dopant organometallic compound is any one or more of an organic indium compound, an organic antimony compound, and an organic phosphorus compound.

A sixth aspect of the present invention is directed to the method of manufacturing the transparent conductive film according to the second or third aspect, wherein the organometallic compound is made of an organic zinc compound, and the dopant organometallic compound is any one or more of an organic aluminum compound, an organic indium compound, and an organic gallium compound.

A seventh aspect of the present invention is directed to the method of manufacturing the transparent conductive film according to any one of the first to sixth aspects, wherein the plasma processing is low-pressure plasma processing to be performed under a decompressed non-oxidizing gas atmosphere.

An eighth aspect of the present invention is directed to the method of manufacturing the transparent conductive film according to the seventh aspect, wherein the low-pressure plasma processing is low-pressure microwave plasma processing or low-pressure radio-frequency plasma processing.

A ninth aspect of the present invention is directed to the method of manufacturing the transparent conductive film according to the seventh or eighth aspect, wherein the decompressed non-oxidizing gas atmosphere is an atmosphere containing any one or more of nitrogen gas, inert gas, and reducing gas and has an atmospheric gas pressure of 2 Pa to 1000 Pa.

A tenth aspect of the present invention is directed to the method of manufacturing the transparent conductive film according to any one of the seventh to ninth aspects, wherein in the low-pressure plasma processing, the substrate is heated to the substrate temperature lower than 300° C. and, simultaneously, ions in low-pressure plasma are cut and the inorganic film is irradiated mainly with radical components.

An eleventh aspect of the present invention is directed to the method of manufacturing the transparent conductive film according to any one of the first to sixth aspects, wherein the plasma processing is atmospheric-pressure plasma processing to be performed under a non-oxidizing gas atmosphere with an atmospheric pressure.

A twelfth aspect of the present invention is directed to the method of manufacturing the transparent conductive film according to the eleventh aspect, wherein the atmospheric-pressure plasma processing is atmospheric-pressure microwave plasma processing or atmospheric-pressure radio-frequency plasma processing.

A thirteenth aspect of the present invention is directed to the method of manufacturing the transparent conductive film according to the eleventh or twelfth aspect, wherein the non-oxidizing gas atmosphere with the atmospheric pressure is an atmosphere containing any one or more of nitrogen gas, inert gas, and reducing gas.

A fourteenth aspect of the present invention is directed to the method of manufacturing the transparent conductive film according to any one of the first to thirteenth aspects, wherein the plasma processing step is a step of selectively performing the plasma processing on only part of the inorganic film formed in the heat energy ray irradiating step to form a patterned conductive oxide fine-particle layer, and by the step, a patterned transparent conductive film is formed.

A fifteenth aspect of the present invention is directed to the method of manufacturing the transparent conductive film according to any one of the first to fourteenth aspects, wherein subsequently to the energy ray irradiation under the oxygen-containing atmosphere while heating to the heating temperature lower than 300° C. and the plasma processing at the substrate temperature lower than 300° C., heating is performed under a neutral atmosphere or a reducing atmosphere at a heating temperature lower than 300° C.

A sixteenth aspect of the present invention is directed to the method of manufacturing the transparent conductive film according to the fifteenth aspect, wherein the neutral atmosphere is an atmosphere containing any one or more of nitrogen gas or inert gas, or the reducing atmosphere is an hydrogen gas atmosphere or an atmosphere containing at least one or more of hydrogen gas or organic solvent vapor in the neutral atmosphere.

A seventeenth aspect of the present invention is directed to the method of manufacturing the transparent conductive film according to any one of the first to sixteenth aspects, wherein the energy ray irradiation under the oxygen-containing atmosphere while heating to the heating temperature lower than 300° C. and the plasma processing at the substrate temperature lower than 300° C. are respectively energy ray irradiation under the oxygen-containing atmosphere while heating to a heating temperature of 100° C. to 250° C. and a plasma processing at a substrate temperature of 100° C. to 250° C.

An eighteenth aspect of the present invention is directed to the method of manufacturing the transparent conductive film according to any one of the first to seventeenth aspects, wherein the oxygen-containing atmosphere has a dew-point temperature equal to or lower than −10° C.

A nineteenth aspect of the present invention is directed to the method of manufacturing the transparent conductive film according to any one of the first to eighteenth aspects, wherein the energy ray irradiation is irradiation of ultraviolet rays containing at least a component having a wavelength equal to or smaller than 200 nm as a main component.

A twentieth aspect of the present invention is directed to the method of manufacturing the transparent conductive film according to the nineteenth aspect, wherein the irradiation of the ultraviolet rays containing at least the component having the wavelength equal to or smaller than 200 nm as the main component is irradiation of ultraviolet rays emitted from any of a low-pressure mercury lamp, an amalgam lamp, or an excimer lamp.

A twenty-first aspect of the present invention is directed to the method of manufacturing the transparent conductive film according to any one of the first to twentieth aspects, wherein the organic indium compound is indium acetylacetonate.

A twenty-second aspect of the present invention is directed to the method of manufacturing the transparent conductive film according to the first or second aspect, wherein the coating of the substrate with the coating liquid for forming transparent conductive film in the coating step is performed by a method which is any of an inkjet printing method, a screen printing method, a gravure printing method, an offset printing method, a flexor printing method, a dispenser printing method, a slit coat method, a die coat method, a doctor blade coat method, a wire bar coat method, a spin coat method, a dip coat method, or a spray coat method.

A twenty-third aspect of the present invention is directed to a transparent conductive film obtained by the method of manufacturing the transparent conductive film according to any one of the first to twenty-second aspect.

A twenty-fourth aspect of the present invention is directed to an element including a conductive oxide film, wherein the conductive oxide film is the transparent conductive film according to the twenty-third aspect.

A twenty-fifth aspect of the present invention is directed to the element according to the twenty-fourth aspect, wherein the element is a thin-film transistor using the conductive oxide film as a channel layer of a thin-film transistor.

A twenty-sixth aspect of the present invention is directed to a transparent conductive substrate including a transparent conductive film on a substrate, wherein the transparent conductive film is the transparent conductive film according to the twenty-third aspect.

A twenty-seventh aspect of the present invention is directed to a device including a transparent electrode, wherein the transparent electrode is the transparent conductive substrate according to the twenty-sixth aspect.

A twenty-eighth aspect of the present invention is directed to the device according to the twenty-seventh aspect, wherein the device is of one type selected from among a light-emitting device, an electric power generating device, a display device, and an input device.

According to the method of manufacturing the transparent conductive film of the present invention, the conductive oxide fine-particle layer densely packed with conductive oxide fine particles having any one or more of indium oxide, tin oxide, and zinc oxide as a main component can be formed by using a coating method with heating at a low temperature lower than 300° C., in particular, 100° C. to 250° C., with a simple manner at low cost. And, the obtained transparent conductive film has both of excellent transparency and high conductivity, and is also excellent in film strength and resistance stability.

For this reason, the transparent conductive substrate having this transparent conductive film formed on the substrate is suitable for light-emitting devices such as an LED element, an electroluminescent lamp (an electroluminescent element), and a field emission lamp; electric power generating devices such as a solar cell; display devices such as a liquid-crystal display (a liquid-crystal element), an electroluminescent display (an electroluminescent element), a plasma display, and an electric paper element; and input devices such as a touch panel.

In addition, since the conductive oxide fine-particle layer densely packed with conductive oxide fine particles having the metal oxide described above as the main component has a high degree of density, carrier mobility can be increased, and the film is also suitable for a conductive oxide film (an oxide semiconductor film) as a channel active layer of a thin-film transistor.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENTS

Embodiments of the present invention are described in detail below.

In the present invention, in a method of manufacturing transparent conductive film to be formed through a coating step of coating a substrate with a coating liquid for forming transparent conductive film having any one or more organo-metallic compounds of an organic indium compound, an organic tin compound, and an organic zinc compound as a main component to form a coating film; a drying step of drying the formed coating film to form a dried coating film; a heat energy ray irradiating step of irradiating the dried coating film with energy rays while heating the dried coating film to form an inorganic film having an inorganic component, which is a metal oxide, as a main component; and a plasma processing step of performing plasma processing on the formed inorganic film to further promote mineralization or crystallization of the film, decomposition and burning of the film occur even at a low heating temperature, that is, a low substrate temperature, lower than 300° C., in particular, 100° C. to 250° C. With this, mineralization or crystallization proceed to form a conductive oxide fine-particle layer densely packed with conductive oxide fine-particles having any one or more of indium oxide, tin oxide, and zinc oxide as a main component, thereby obtaining a transparent conductive film excellent in transparency and conductivity.

[Structure of the Transparent Conductive Film]

First, the structure of the transparent conductive film is described.

In the following, description is made by taking a transparent conductive film made of indium oxide (ITO) doped with tin as an example. The same goes for a transparent conductive film having tin oxide or zinc oxide other than indium oxide as a main component. Furthermore, the same goes for various amorphous conductive oxide films (oxide semiconductor films) made of InGaZnO$_4$ or others having any one or more of indium oxide, tin oxide, and zinc oxide.

First, when a vapor deposition method such as a sputtering method is used to form a transparent conductive film made of ITO, a polycrystalline ITO film structure with ITO crystal particles arranged via a grain boundary is normally formed. In this ITO film structure, ITO fine particles are hardly observed.

Figure 1:
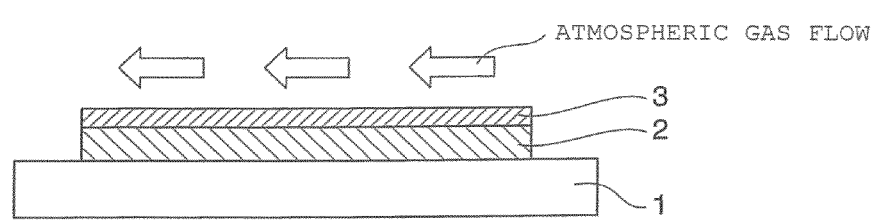
FIG. 1 is a schematic view showing an example of a baking process in a transparent conductive film manufacturing process in a conventional coating method.

On the other hand, as shown in FIG. 1, it is known that a transparent conductive film made of ITO formed by a coating method in which a substrate 2 is coated with a coating liquid for forming transparent conductive film having an organic indium compound and an organic tin compound as main components and dried to obtain a dried coating film 3, which is baked in an atmospheric atmosphere at a high temperature equal to or higher tan 350° C. by using a heating apparatus 1 such as a hot plate, normally has a film structure with ITO crystal particles binding to each other and, although the particle diameter of each of the ITO fine particle and the size of a void present between the ITO fine particles vary according to the heating process condition, the transparent conductive film is configured of ITO fine particles having not little open pores.

And, in the transparent conductive film with the ITO fine particles biding to each other formed with this coating method, its conductive mechanism intervenes in a contact portion (a binding portion) of the ITO fine particles. This causes a decrease in conductivity in the contact portion occurring possibly because the ITO fine particles make contact with each other in a subtle area, degradation of conductivity with time in atmospheric exposure occurring possibly because oxygen or water vapor in the atmosphere enters the film through open pores to degrade the contacts between the ITO fine particles, a decrease in film strength occurring possibly because the film is roughly packed with the ITO fine particles, and other problems.

Therefore, it is important to densely packing the film with the conductive oxide fine particles and also promote crystal growth of the conductive oxide fine particles to form a dense film structure with less open pores and having a conductive oxide fine-particle layer having any one or more of indium oxide, tin oxide, and zinc oxide with reinforced contacts between the conductive oxide fine particles to achieve an improvement in conductivity of the transparent conductive film and also an improvement in film strength and also to significantly suppress degradation of conductivity with time.

Thus, in the present invention, in the method of manufacturing a transparent conductive film to be formed by a coating method using a coating liquid for forming transparent conductive film to form a coating liquid, the transparent conductive film following a dried coating film obtained by drying the coating film, irradiation of the dried coating film with heat energy rays under an oxygen-containing atmosphere and plasma processing under a non-oxidizing gas atmosphere are performed, thereby forming a dense conductive oxide fine-particle layer having any one or more of indium oxide, tin oxide, and zinc oxide as a main component, with contacts between conductive oxide fine particles being reinforced.

[Coating Liquid for Forming Transparent Conductive Film]

Next, the coating liquid for forming transparent conductive film for use in the present invention is described in detail.

In the present invention, by using a coating liquid for forming transparent conductive film having an organometallic compound of any one or more of an organic indium compound, an organic tin compound, and an organic zinc compound, as a main component, a transparent conductive film having one or more of indium oxide, tin oxide, and zinc oxide as a main component is formed. In general, the transparent conductive film preferably has high conductivity and, in that case, the conductivity is improved by doping an oxide such as indium oxide, tin oxide, and zinc oxide, with a metal compound other than these, mainly a metal oxide. That is, if indium oxide, tin oxide, and zinc oxide containing a dopant metal compound is used as a conductive oxide, the conductivity of the transparent conductive film is improved. This is because the dopant metal compound has a function of increasing concentration (carrier density) of electrons as carriers in a conductive oxide.

In a specific doping method, a predetermined amount of a dopant organometallic compound is mixed in the coating liquid for forming transparent conductive film having any one or more organometallic compounds among an organic indium compound, an organic tin compound, and an organic zinc compound as a main component.

First, the coating liquid for forming transparent conductive film having an organic indium compound as a main component is described below.

Examples of the organic indium compound for use in the present invention include indium acetylacetonate (standard nomenclature: tris(acetylacetonato)indium) [$In(C_5H_7O_2)_3$], indium 2-ethylhexanoate, indium formate, and indium alkoxide. Basically, however, any organic indium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, indium acetylacetonate is preferable because it has a high degree of solubility in an organic solvent, becomes an oxide by being decomposed and burnt (oxidized) at a temperature of 200° C. to 250° C. even in simple atmospheric heating and, if irradiation of energy rays (irradiation of ultraviolet rays having a wavelength equal to or smaller than 200 nm) is used together, becomes an oxide by being decomposed and burnt (oxidized) at a temperature further lower than the temperature above.

Next, as the dopant organometallic compound to improve conductivity, one or more of an organic tin compound, an organic titanium compound, an organic germanium compound, an organic zinc compound, an organic tungsten compound, an organic zirconium compound, an organic tantalum compound, an organic niobium compound, an organic hafnium compound, and an organic vanadium compound are preferable.

Note that since low conductivity to some extent may be required depending on the device to which the transparent conductive film is to be applied, addition of the dopant organometallic compound to the coating liquid for forming transparent conductive film is performed as appropriate when necessary.

Examples of the organic tin compound (the valence of tin in the compound may be 2 or 4) as the dopant organometallic compound include tin acetylacetonate (standard nomenclature: di-n-butyl bis(2,4-pentanedionato) tin, [$Sn(C_4H_9)_2(C_9H_7O_2)_2$]), tin octylate, tin 2-ethylhexanoate, tin acetate(II) [$Sn(CH_9COO)_2$], tin acetate(IV) [$Sn(CH_3COO)_4$], di-n-butyl tin diacetate [$Sn(C_4H_9)_2(CH_3COO)_2$], tin formate, and tin-tert-butoxide [$Sn(C_4H_9O)_4$] as a tin alkoxide. Basically, however, any organic tin compound can be used as long as it is dissolved in a solvent and is decomposed to an oxide without generating harmful gas such as chlorine gas or nitrogen oxide gas at the time of heat energy ray irradiation, plasma processing, or heating process thereafter. Among these, tin acetylacetonate is preferable because it is relatively inexpensive and easily available.

Examples of the organic titanium compound as the dopant organometallic compound include titanium acetylacetonate (standard nomenclature: titanium-di-n-butoxide bis(2,4-pentanedionate) tin [$Ti(C_4H_9O)_2(C_5H_7O_2)_2$]), titanyl(IV) acetylacetonate [$C_9H_7O_2)_4TiO$], titanium diisopropoxide bis(2,4-pentanedionate) [$C_{16}H_{36}O_4Ti$], and others as titanium acetylacetonate complexes; and titanium tetraethoxide [$Ti(C_2H_5O)_2$], titanium(IV)-tert-butoxide [$Ti(C_4H_9O)_4$], titanium tetra-n-butoxide [$Ti(C_4H_9O)_4$], titanium tetraisopropoxide [$Ti(C_3H_7O)_4$], and others as titanium alkoxides. Basically, however, any organic titanium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, titanium acetylacetonate, titanium tetra-n-butoxide, and titanium tetraisopropoxide are preferable because they are inexpensive and easily available.

Examples of the organic germanium compound as the dopant organometallic compound include germanium tetraethoxide [$Ge(C_2H_5O)_4$], germanium tetra-n-butoxide [$Ge(C_4H_9O)$], germanium tetraisopropoxide [$Ge(C_3H_7O)_4$], and others as germanium alkoxides; β-carboxyethylgermaniumoxide [$(GeCH_2CH_2COOH)_2O_3$], tetraethylgermanium [$Ge(C_2H_5)_4$], tetrabutylgermanium [$Ge(CH_9)_4$], tributylgermanium [$Ge(C_4H_9)_3$], and others. Basically, however, any organic germanium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, germanium tetraethoxide, germanium tetra-n-butoxide, and germanium tetraisopropoxide are preferable because they are relatively inexpensive and easily available.

Examples of the organic zinc compound as the dopant organometallic compound include zinc acetylacetonate (standard nomenclature: zinc-2,4-pentanedionate) [$Zn(C_5H_7O_2)_2$], zinc-2,2,6,6-tetramethyl-3,5-heptanedionate [Zn $[C_{11}H_{19}O_2)_2]$, and others as zinc acetylacetonate complexes. Basically, however, any organic zinc compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, zinc acetylacetonate is preferable because it is inexpensive and easily available.

Examples of the organic tungsten compound as the dopant organometallic compound include tungsten (V) ethoxide $[W(C_2H_5O)_5]$, tungsten (VI) ethoxide $[W(C_2H_5O)_6]$, and others as tungsten alkoxides. Basically, however, any organic tungsten compound can be used as long as it is dissolved in a solvent and is decomposed to an oxide without generating harmful gas such as chlorine gas or nitrogen oxide gas at the time of heat energy ray irradiation, microwave plasma processing, or heating process thereafter.

Examples of the organic zirconium compound as the dopant organometallic compound include zirconium di-n-butoxide bis(2,4-pentanedionate) $[Zr(C_4H_9O)_2(C_5H_7O_2)_2]$, zirconium acetylacetonate (zirconium-2,4-pentanedionate) $[Zr(C_5H_7O_2)_4]$, and others as zirconium acetylacetonate complexes; and zirconium ethoxide $[Zr(C_2H_5O)_4]$, zirconium-n-propoxide $[Zr(C_3H_7O)_4]$, zirconium isopropoxide $[Zr(C_3H_7O)_4]$, zirconium-n-butoxide $[Zr(C_4H_9O)_4]$, zirconium-tert-butoxide $[Zr(C_4H_9O)_4]$, zirconium-2-methyl-2-butoxide $[Zr(C_5H_{11}O)_4]$, zirconium-2-methoxymethyl-2-propoxide $[Zr(C_5H_{11}O_2)_4]$, and others as zirconium alkoxides. Basically, however, any organic zirconium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, zirconium-n-propoxide and a zirconium-n-butoxide are preferable because they are relatively inexpensive and easily available.

Examples of the organic tantalum compound as the dopant organometallic compound include tantalum(V) tetraethoxide-pentanedionate) $[Ta(C_5H_7O_2)(OC_2H_5)_4]$ as a tantalum acetylacetonate complex; and tantalum methoxide $[Ta(CH_3O)_5]$, tantalum ethoxide $[Ta(C_2H_5O)_5]$, tantalum isopropoxide $[Ta(C_3H_7O)_5]$, tantalum-n-butoxide $[Ta(C_4H_9O)_5]$, tetraethoxyacetylacetonato tantalum $[Ta(C_2H_5O)_4(C_5H_7O_2)]$, and others as tantalum alkoxides. Basically, however, any organic tantalum compound can be used as long as it is dissolved in a solvent and is decomposed to an oxide without generating harmful gas such as chlorine gas or nitrogen oxide gas at the time of heat energy ray irradiation, plasma processing, or heating process thereafter.

Examples of the organic niobium compound as the dopant organometallic compound include niobium ethoxide $[Nb(C_2H_5O)_5]$, niobium-n-butoxide $[Nb(C_4H_9O)_5]$, and others as niobium alkoxides. Basically, however, any organic niobium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Examples of the organic hafnium compound as the dopant organometallic compound include hafnium di-n-butoxide bis (2,4-pentanedionate) $[Hf(C_4H_9O)_2(C_5H_7O_2)_2]$, hafnium acetylacetonate (hafnium-2,4-pentanedionate) $[Hf(C_5H_7O_2)_4]$, and others as hafnium acetylacetonate complexes; and hafnium ethoxide $[Hf(C_2H_5O)_4]$, hafnium-n-butoxide $[Hf(C_4H_9O)_4]$, hafnium-tert-butoxide $[Hf(C_4H_9O)_4]$, hafnium (VI) isopropoxidemonoisopropylate $[Hf(C_3H_7O)_4(C_3H_7OH)]$, and others as hafnium alkoxides. Basically, however, any organic hafnium compound can be used as long as it is dissolved in a solvent and is decomposed to an oxide without generating harmful gas such as chlorine gas or nitrogen oxide gas at the time of heat energy ray irradiation, plasma processing, or heating process thereafter. Among these, hafnium-n-butoxide is preferable because it is relatively inexpensive and easily available.

Examples of the organic vanadium compound as the dopant organometallic compound include vanadium oxide bis-2,4-pentanedionate $[VO(C_5H_7O_2)_2]$, vanadium acetylacetonate (vanadium-2,4-pentanedionate) $[V(C_5H_7O_2)_3]$, and others as vanadium acetylacetonate complexes. Basically, however, any organic vanadium compound can be used as long as it is dissolved in a solvent and is decomposed to an oxide without generating harmful gas such as chlorine gas or nitrogen oxide gas at the time of heat energy ray irradiation, plasma processing, or heating process thereafter.

Next, the coating liquid for forming transparent conductive film having an organic tin compound as a main component is also described below.

As the organic tin compound for use in the present invention, the organic tin compound described in the description of the coating liquid for forming transparent conductive film having the organic indium compound as a main compound can be used. As a dopant organometallic compound to improve conductivity, one or more of an organic indium compound, an organic antimony compound, and an organic phosphorous compound are preferable.

As the organic indium compound as the dopant organometallic compound, the organic indium compound described in the description of the coating liquid for forming transparent conductive film having the organic indium compound as a main compound can be used.

Examples of the organic antimony compound as the dopant organometallic compound include antimony(III) acetate $[Sb(CH_3COO)_3]$; and antimony(III) ethoxide $[Sb(C_2H_5O)_3]$, antimony (III)-n-butoxide $[Sb(C_4H_9O)_3]$, and others as antimony alkoxides. Basically, however, any organic antimony compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, antimony(III)-n-butoxide is preferable because it is relatively inexpensive and easily available.

Examples of the organic phosphorus compound as the dopant organometallic compound include triethylphosphate $[PO(C_2H_5O)_3]$ and others. Basically, however, any organic phosphorus compound can be used as long as it is dissolved in a solvent and is decomposed to an oxide without generating harmful gas such as chlorine gas or nitrogen oxide gas at the time of heat energy ray irradiation, plasma processing, or heating process thereafter.

Furthermore, the coating liquid for forming transparent conductive film having an organic zinc compound as a main component is also described below.

As the organic zinc compound for use in the present invention, the organic zinc compound described in the description of the coating liquid for forming transparent conductive film having the organic indium compound as a main compound can be used. As a dopant organometallic compound to improve conductivity, one or more of an organic aluminum compound, an organic indium compound, and an organic gallium compound are preferable.

As the organic indium compound as the dopant organometallic compound, the organic indium compound described in the description of the coating liquid for forming transparent conductive film having the organic indium compound as a main compound can be used.

Examples of the organic aluminum compound as the dopant organometallic compound include aluminum acetylacetonate (aluminum-2,4-pentanedionate) [$Al(C_5H_7O_2)_3$] as an aluminum acetyleacetone complex; and aluminum ethoxide [$Al(C_2H_5O)_3$], aluminum-n-butoxide [$Al(C_4H_9O)_3$], aluminum isopropoxide [$Al(C_3H_7O)_3$], and others as aluminum alkoxides. Basically, however, any organic aluminum compound can be used as long as it is dissolved in a solvent and is decomposed to an oxide without generating harmful gas such as chlorine gas or nitrogen oxide gas at the time of heat energy ray irradiation, plasma processing, or heating process thereafter.

Among these, aluminum acetylacetonate and aluminum-n-butoxide are preferable because they are relatively inexpensive and easily available.

Examples of the organic gallium compound as the dopant organometallic compound include gallium acetylacetonate (gallium-2,4-pentanedionate) [$Ga(C_5H_7O_2)_3$] as a gallium acetyleacetone complex; and gallium ethoxide [$Ga(C_2H_5O)_3$] and others as gallium alkoxides. Basically, however, any organic gallium compound can be used as long as it is dissolved in a solvent and is decomposed to an oxide without generating harmful gas such as chlorine gas or nitrogen oxide gas at the time of heat energy ray irradiation, plasma processing, or heating process thereafter.

The organometallic compound of any one or more of the organic indium compound, the organic tin compound, and the organic zinc compound in the coating liquid for forming transparent conductive film or the organometallic compound and the dopant organometallic compound are main compound materials for forming a transparent conductive film on the substrate, and a total content is preferably in a range of 1 weight % to 30 weight %, more preferably 5 weight % to 20 weight %.

If the total content is smaller than 1 weight %, only a transparent conductive film having a thin film thickness can be obtained, and therefore sufficient conductivity cannot be obtained. Also, if the total content is larger than 30 weight %, the organometallic compound in the coating liquid for forming transparent conductive film is easily precipitated to decrease stability of the coating liquid or to cause a too much increase in the thickness of the transparent conductive film to be obtained to cause a crack to impair conductivity.

Also, when the dopant organometallic compound is mixed in the coating liquid for forming transparent conductive film (when high conductivity is desired to be obtained), the content ratio between the organometallic compound and the dopant organometallic compound is preferably 99.9:0.1 to 66.7:33.3 in terms of a molar ratio of the organometallic compound:the dopant organometallic compound. In detail, except for the case in which an organic zinc compound is used as the dopant organometallic compound in the coating liquid for forming transparent conductive film having an organic indium compound as a main component, the content ratio is desirably 99.9:0.1 to 87:13 and preferably 99:1 to 91:9, in terms of a molar ratio of the organometallic compound:the dopant organometallic compound.

Note that when an organic zinc compound is used as the organometallic compound for doping in the coating liquid for forming transparent conductive film having an organic indium compound as a main component, the content ratio is desirably 95:5 to 66.7:33.3 and preferably 91:9 to 71:29, in terms of a molar ratio of the organometallic compound:the dopant organometallic compound.

However, since an appropriate range of the mixture ratio of the dopant organic metal compound in the coating liquid for transparent conductive film varies depending on the process conditions such as substrate heating temperature in the microwave plasma processing process, the range is preferably further optimized as appropriate within the range described above.

Even if the amount of the dopant organometallic compound is too small or large from out of the molar ratio range, carrier density of the transparent conductive film may be decreased to abruptly degrade the conductivity of the transparent conductive film. Also, when the dopant organometallic compound is large from out of the molar ratio range described above, crystal growth of the conductive oxide fine particles may become less prone to proceed to degrade conductivity, which is not preferable.

Furthermore, an organic binder is preferably added to the coating liquid for forming transparent conductive film.

With addition of this binder, wettability with respect to the substrate is improved. At the same time, the viscosity of the coating liquid can be adjusted. The binder is preferably made of a material that is decomposable or burnable at the time of heat energy ray irradiation, plasma processing, or heating process thereafter. As this material, a cellulose complex, an acrylic resin, or the like is effective.

Examples of the cellulose derivative include methylcellulose, ethylcellulose, hydroxy methylcellulose, hydroxyethylcellulose, hydroxypropylcellulose, hydroxyethylmethylcellulose, hydroxypropylmethylcellulose, ethylhydroxyethylcellulose, carboxymethylcellulose, carboxyethylcellulose, carboxyethylmethylcellulose, nitrocellulose, and others. Among these, hydroxypropylcellulose (hereinafter may be referred to as "HPC") is preferable.

With the use of this HPC, sufficient wettability with a content equal to or smaller than 5 weight % can be obtained, and significant viscosity adjustment can be performed. Furthermore, while a burning start temperature of HPC is approximately 300° C. in simple heating in the atmosphere, with the use of energy ray irradiation together (for example, irradiation of ultraviolet rays having a wavelength equal to or smaller than 200 nm), HPC is decomposed and burnt even at a heating temperature lower than 300° C. Therefore, without inhibiting particle growth of conductive particles to be generated, a transparent conductive film with high conductivity can be fabricated. If the content of HPC is larger than 5 weight %, HPC becomes gelated and tends to be left in the coating liquid, thereby forming an extremely porous transparent conductive film to significantly impair transparency and conductivity.

Here, for example, when ethylcellulose is used as the cellulose derivative in place of HPC, the viscosity of the coating liquid can be set lower than the case of using HPC. However, pattern printability is slightly degraded in screen printing or the like in which a coating liquid with high viscosity is preferable.

Meanwhile, nitrocellulose is excellent in decomposability, but may generate harmful nitrogen oxide gas at the time of heat energy ray irradiation, plasma processing, or heating process thereafter, thereby possibly posing degradation of a heating furnace or a problem in exhaust gas processing. As described above, the cellulose derivate for use is required to be selected as appropriate according to the situation.

Also, as the acrylic resin, an acrylic resin burnable at a relatively low temperature is preferable.

As the solvent for use as the coating liquid for forming transparent conductive film, alkylphenol and/or alkenylphenol and dibasic acid ester, alkylphenol and/or alkenylphenol and benzyl acetate, or a solution of mixture thereof, which are capable of dissolving an acetylacetonate complex such as indium acetylacetonate, zinc acetylacetonate, or vanadium acetylacetonate at a high concentration are preferably used. Examples of alkylphenol and/or alkenylphenol include cresols, xylenol, ethylphenol, p-tert-butylphenol, octylphenol, nonylphenol, cashew nut shell liquid [3 pentadecadesylphenol], and others. As the dibasic acid ester (for example, dibasic acid dimethyl, dibasic acid diethyl), any of succinic acid ester, glutaric acid ester, adipic acid ester, malonic acid ester, phthalic acid ester, and others is used.

Furthermore, as a solvent to be mixed in the coating liquid for forming transparent conductive film to decrease viscosity of the coating liquid or improve coatability, any can be used as long as it has compatibility with a solvent in which an organic indium compound, a dopant organometallic compound, and a cellulose derivative and/or acrylic resin is dissolved. Examples, although not restrictive, include water; alcohol-based solvents such as methanol (MA), ethanol (EA), 1-propanol (NPA), isopropanol (IPA), butanol, pentanol, benzil alcohol, and diacetone alcohol (DAA); ketone-based solvents such as acetone, methyl ethyl ketone (MEK), methyl propyl ketone, methyl isobutyl ketone (MIBK), cyclohexanone, and isophorone; ester-based solvents such as ethyl acetate, butyl acetate, isobutyl acetate, amyl formate, isoamyl acetate, butyl propionate, isopropyl butyrate, ethyl butyrate, butyl butyrate, methyl lactate, ethyl lactate, methyl oxyacetate, ethyl oxyacetate, butyl oxyacetate, methoxy methyl acetate, methoxy ethyl acetate, methoxy butyl acetate, ethoxy methyl acetate, ethoxy ethyl acetate, 3-oxypropionic acid methyl, 3-oxypropionic acid ethyl, 3-methoxy propionic acid methyl, 3-methoxypropionic acid ethyl, 3-ethoxypropionic acid methyl, 3-ethoxypropionic acid ethyl, 2-oxypropionic acid methyl, 2-oxypropionic acid ethyl, 2-oxypropionic acid propyl, 2-methoxypropionic acid methyl, 2-methoxypropionic acid ethyl, 2-methoxypropionic acid propyl, 2-ethoxypropionic acid methyl, 2-ethoxypropionic acid ethyl, 2-oxy-2-methylpropionic acid methyl, 2-oxy-2-methylpropionic acid ethyl, 2-methoxy-2-methylpropionic acid methyl, 2-ethoxy-2-methylpropionic acid ethyl, methyl pyruvic acid, ethyl pyruvic acid, propyl pyruvic acid, aceto methyl acetate, aceto ethyl acetate, 2-oxobutanoate methyl, and 2-oxobutanoate ethyl; glycol derivatives such as ethylene glycol monomethyl ether (MCS), ethylene glycol monoethyl ether (ECS), ethylene glycol isopropyl ether (IPC), ethylene glycol monobutyl ether (BCS), ethylene glycol monoethyl ether acetate, ethylene glycol monobutyl ether acetate, propylene glycol monomethyl ether (PGM), propylene glycol ethyl ether (PE), propylene glycol monomethyl ether acetate (PGM-AC), propylene glycol ethyl ether acetate (PE-AC), diethylene glycol monomethyl ether, diethylene glycol monoethyl ether, diethylene glycol monobutyl ether, diethylene glycol monomethyl ether acetate, diethylene glycol monoethyl ether acetate, diethylene glycol monobutyl ether acetate, diethylene glycol dimethyl ether, diethylene glycol diethyl ether, diethylene glycol dibutyl ether, dipropylene glycol monomethyl ether, dipropylene glycol monoethyl ether, and dipropylene glycol monobutyl ether; benzene derivatives such as toluene, xylene, mesitylene, and dodecylbenzene; formamide (FA), N-methyl formamide, dimethyl formamide (DMF), dimethyl acetoamide, dimethyl sulfoxide (DMSO), N-methyl-2-pyrrolidone (NMP), γ-butyrolactone, ethylene glycol, diethylene glycol, propylene glycol, dipropylene glycol, 1,3-butylene glycol, pentamethylene glycol, 1,3-octylene glycol, tetrahydrofuran (THF), chloroform, mineral sprits, terpineol, and a solution of mixture of some of these components.

In consideration of stability and film formability of the coating liquid, as the solvent for use, methyl ethyl ketone (MEK), cyclohexanone, propylene glycol monomethyl ether (PGM), N-methyl-2-pyrrolidone (NMP), γ-butyrolactone, and others are preferable.

The coating liquid for forming transparent conductive film for use in the present invention is manufactured by heating and dissolving, in the solvent, a mixture of any one or more organometallic compounds of the organic indium compound, the organic tin compound, and the organic zinc compound and, furthermore the mixture having added thereto a binder as required.

Heating and dissolving are performed normally at a heating temperature of 60° C. to 200° C. and by agitating for 0.5 hour to 12 hours. If the heating temperature is lower than 60° C., sufficient dissolution cannot be achieved. For example, in the case of the coating liquid for forming transparent conductive film having the organic indium compound as a main component, precipitation and separation of the metal compound such as indium acetylacetonate occur to decrease stability of the coating liquid. If the heating temperature is higher than 200° C., evaporation of the solvent becomes apparent to change the composition of the coating liquid. Therefore, such temperatures are not preferable.

Since the viscosity of the transparent conductive film can be adjusted based on the molecular weight and content of the binder and the type of the solvent, the viscosity can be adjusted for support so as to be suitable for various coating methods such as an inkjet printing method, a screen printing method, a gravure printing method, an offset printing method, a flexor printing method, a dispenser printing method, a slit coat method, a die coat method, a doctor blade coat method, a wire bar coat method, a spin coat method, and a spray coat method.

A coating liquid with a high viscosity (approximately 5000 mPa·s to 50000 mPa·s) can be fabricated by making 5 weight % or smaller, preferably 2 weight % to 4 weight %, of a binder with a high molecular weight contained therein. A coating liquid with a low viscosity (approximately 5 mPa·s to 500 mPa·s) can be fabricated by making 5 weight % or smaller, preferably 0.1 weight % to 2 weight %, of a binder with a low molecular weight contained therein and diluting the coating liquid with a dilution solvent with a low viscosity. Also, a coating liquid with an intermediate viscosity (approximately 500 mPa·s to 5000 mPa·s) can be fabricated by mixing the coating liquid with the high viscosity and the coating liquid with the low viscosity together.

[Transparent Conductive Film Manufacturing Method]

The method of manufacturing the transparent conductive film of the present invention is described in detail.

The transparent conductive film of the present invention is formed through a coating process of coating a substrate with a coating liquid for forming transparent conductive film to form a coating film, a drying process of drying the coating film to form a dried coating film, a heat energy ray irradiating process of irradiating the dried coating film while heating the dried coating film to form an inorganic film, and a plasma processing process of performing plasma processing on the inorganic film.

(a) Coating Process

The substrate is coated with the coating liquid for forming transparent conductive film by using various coating methods such as an inkjet printing method, a screen printing method, a gravure printing method, an offset printing method, a flexor printing method, a dispenser printing method, a slit coat method, a die coat method, a doctor blade coat method, a wire bar coat method, a spin coat method, and a spray coat method.

This coating is preferably performed in a clean atmosphere such as a clean room where temperature and humidity are controlled. In general, the temperature is at a room temperature (approximately 25° C.) and the humidity is 40% RH to 60% RH.

As the substrate, a heat-resistance inorganic substrate made of soda lime glass, non-alkali glass, quartz glass, or the like or any various resin substrate (a plastic film) made of polyethylene terephthalate (PET), polyethylene naphthalate (PEN), nylon, polyethersulfone (PES), polyethylene (PE), polypropylene (PP), urethane, cycloolefin resin (such as ZEONOR [manufactured by Zeon Corporation] and ARTON [manufactured by JSR Corporation]), fluorine-based resin, polyamide-imide, polyimide (PI), or others can be used.

(b) Drying Process

In this drying process, the substrate coated with the coating liquid for forming transparent conductive film is kept in the atmosphere normally at 80° C. to 180° C. for one minute to thirty minutes, preferably for two minutes to ten minutes, to dry the coating film, thereby fabricating a dried coating film. Drying conditions can be selected as appropriate according the type of the substrate for use, the coating thickness of the coating liquid for forming transparent conductive film, and others, and are not restricted to the drying conditions described above. However, in consideration of productivity, the drying time is desirably reduced to a minimum with which the film quality of the obtained dried coating film is not deteriorated. Also, the drying temperature is required to be equal to or lower than the heat-resistant temperature of the substrate for use. For example, in the case of the PET film, the drying temperature is required to be set to be equal to or lower than 160° C. (although it depends on the drying time).

Note that drying under reduced pressure (ultimate pressure: normally equal to or lower than 1 kPa) can be applied as required in place of drying in the atmosphere. In drying under reduced pressure, the solvent in the coating liquid for forming transparent conductive film used to coat the substrate is forcibly removed under reduced pressure to cause drying to easily proceed. Therefore, drying at a lower temperature can be performed compared with drying in the atmosphere. Thus, this is useful when a substrate made of a material with poor heat resistance or solvent resistance.

This dried coating film has the solvent described above vaporized and removed from the coating liquid for forming transparent conductive film, and is configured of an organic-based component such as an organometallic compound of any one or more of an organic indium compound, an organic tin compound, and an organic zinc compound, (the dopant organometallic compound), a binder, and others.

(c) Heat Energy Ray Irradiating Process

Figure 2:
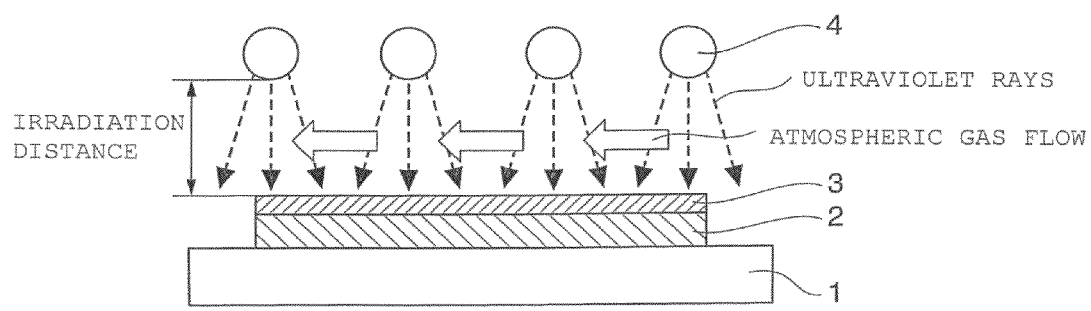
FIG. 2 is a schematic view showing an example of a heat energy ray irradiating process in a transparent conductive film manufacturing process in a coating method according to the present invention.

In the heat energy ray irradiating process, normally as shown in FIG. 2, by using the heating apparatus such as the hot plate 1 and an energy ray irradiation lamp 4, the dried coating film 3 obtained in the previous drying process is irradiated with energy rays while heating at a heating temperature lower than 300° C. under an oxygen-containing atmosphere, thereby decomposing and burning (oxidizing) organic-based components such as any one or more organometallic compounds of the organic indium compound, the organic tin compound, and the organic zinc compound in the dried coating film or any one or more organometallic compounds of the organic indium compound, the organic tin compound, and the organic zinc compound, containing a dopant organometallic compound, and a binder. With this, an inorganic film made of a conductive oxide, which is an inorganic component, that is, a transparent conductive film as a conductive oxide fine-particle layer densely packed with extremely-fine conductive oxide fine particles (conductive oxide fine particles crystallized at a nano level) having a particle diameter smaller than 3 nm is obtained in the present invention.

Note that, normally, heat rays are also emitted from the energy ray irradiation lamp, in addition to the energy rays required for decomposition and burning (oxidation) of the organic-based components. Therefore, for example, when the heating temperature is low at approximately 40° C. to 50° C., the heating apparatus such as a hot plate is not necessarily required. In other words, even without heating by the heating apparatus such as a hot plate, the substrate is heated to at least approximately 40° C. to 50° C. with heat ray irradiation from the energy ray irradiation lamp.

That is, in the heat energy ray irradiating process, when the amount of irradiation of energy rays is increased in a heating temperature range lower than 300° C., that is, when the time for irradiating energy rays becomes long, any one or more organometallic compounds (including one containing a dopant organometallic compound) of the organic indium compound, the organic tin compound, and the organic zinc compound in the dried coating film are gradually decomposed and burnt (oxidized) to be first converted to a conductive oxide in an amorphous state (here, referring to the state of extremely fine particles having a crystallite size found by X-ray diffraction smaller than 3 nm), that is, so-called mineralization occurs. With this, final components of the transparent conductive film are formed.

On the other hand, the binder is also gradually decomposed and burnt (oxidized) with energy ray irradiation under the oxygen-containing atmosphere in the heat energy ray irradiating process. For this reason, the binder is converted mainly to carbon dioxide ($CO_2$) to be vaporized into the atmosphere to disappear from the film. Although it depends on the type of binder, the binder almost completely disappears with irradiation of energy rays while heating at 40° C. to 250° C. when, for example, HPC is used, and therefore, eventually, the binder is hardly left in the transparent conductive film.

Note that a large amount of the binder is left at an initial stage of the heat energy ray irradiating process, that is, in a state in which the energy ray irradiation time is approximately several tens of seconds to three minutes, although depending on energy ray illuminance, with the binders uniformly intervening in the conductive oxide formed through the mineralization described above to suppress crystallization at a nano level. When the energy ray irradiation time is increased, binder components gradually disappear, and crystallization of the conductive oxide described above starts at a nano level. With this, an extremely fine conductive oxide fine-particle layer in an amorphous state is considered to be formed.

As described above, organic components of the dried coating film are gradually decomposed and burnt (oxidized) with irradiation of heat energy rays under the oxygen-containing atmosphere to cause mineralization of the film to proceed, thereby gradually decreasing the thickness of the film. For example, with heat energy ray irradiation under the oxygen-containing atmosphere, a dried coating film having a thickness of 500 nm to 600 nm is eventually changed to be an inorganic film having a thickness on the order of 110 nm to 130 nm.

Note that the heating temperature in the heat energy ray irradiating process is desirably lower than 300° C., preferably in a range of 40° C. to 250° C., more preferably in a range of 100° C. to 200° C., and further preferably in a range of 100° C. to 150° C. A temperature equal to or higher than 300° C. is not preferable because thermal decomposition of the dried coating film to be subjected to energy ray irradiation starts before energy ray irradiation, thereby inhibiting film densification. While a temperature lower than 40° C. is not totally impractical, attention is required to be sufficiently paid to a decrease in speed of mineralization and densification of the dried coating film by heat ray energy ray irradiation.

Here, this heat energy ray irradiation is preferably irradiation of ultraviolet rays including at least a wavelength equal to or smaller than 200 nm as a main component and, more specifically, irradiation of ultraviolet rays emitted from any of a low-pressure mercury lamp, an amalgam lamp, and an excimer lamp. A preferable irradiation amount of ultraviolet rays is such that light having a wavelength equal to or smaller than 200 nm has an illuminance equal to or larger than 2 mW/cm$^2$, preferably 4 mW/cm$^2$, and the irradiation time is desirably two minutes, preferably four minutes or longer.

The irradiation amount of ultraviolet rays can be adjusted as appropriate depending on a distance between the substance and the lamp (a irradiation distance), irradiation time, or lamp output. In energy ray irradiation to the entire surface of the substrate using the lamp described above, for example, a straight-tube lamp may be arranged in parallel for irradiation, or a surface light source of a grid lamp may be used.

The low-pressure mercury lamp and the excimer lamp capable of emitting light having a wavelength equal to or smaller than 200 nm are described in detail below. In the heat energy ray irradiating process of the present invention, the low-pressure mercury lamp is preferably used, which has less use restrictions and, when a heating process is performed concurrently, can make an influence of heating on the lamp small.

Note that while the low-pressure mercury lamp generally has argon gas and mercury enclosed in a quartz glass tube, the amalgam lamp has an amalgam alloy which is an alloy of mercury and a special rare metal enclosed therein, thereby allowing high output approximately twice to three fold compared with the low-pressure mercury lamp, and the output wavelength characteristics are approximately the same as those of the low-pressure mercury lamp, and therefore detailed description is omitted. As a matter of course, as with the low-pressure mercury lamp, the amalgam lamp is preferably used in the heat energy ray irradiating process, because the amalgam lamp has less use restrictions and, when a heating process is performed concurrently, can make an influence of heating on the lamp small.

However, a special apparatus that cools a lamp with nitrogen gas or the like without absorption of ultraviolet rays as cooling gas can be used. In this case, the above does not apply.

The low-pressure mercury lamp emits ultraviolet rays having wavelengths of 185 nm and 254 nm. For example, in the air, as in equations (1) to (3) shown in Equation 1, light of 185 nm decomposes oxygen to generate ozone and, furthermore, light of 254 nm decomposes that ozone at a speed in units of ms (milliseconds) to generate high-energy active atomic oxygen O($^1$D). At the same time, light of 185 nm (photon energy: 647 kJ/mol) and light of 254 nm (photon energy: 472 kJ/mol) cut a chemical bond of an organic substance, and ozone and active atomic oxygen act on the organic substance with its chemical bond being cut. With this, the organic substance is considered to be eventually subjected to oxidative destruction and vaporization to water and carbon dioxide, and a relatively long effective irradiation distance of 0 mm to 20 mm can be ensured (its critical irradiation distance is 200 mm).

[Equation 1]

$$O_2 + hu(185\text{ nm}) \rightarrow O(^3P) + O(^3P) \tag{1}$$

$$O(^3P) + O_2 \rightarrow O_3 \tag{2}$$

$$O_3 + hu(254\text{ nm}) \rightarrow O(^1D) + O_2 \tag{3}$$

h: blank constant, u: optical frequency,
O($^3$P): oxygen atom in a basal state,
O($^1$D): oxygen atom in an excited state On the other hand, the excimer lamp (xenon excimer lamp) emits ultraviolet rays having a wavelength of 172 nm, and has a feature such that, unlike the low-pressure mercury lamp, high-energy active atomic oxygen O(1D) can be directly generated for example, in the air, as in equation (4) shown in Equation 2 below. Here, for dissociation of an oxygen molecule shown in equation (4), a wavelength equal to or smaller than 175 nm is required, and therefore this dissociation does not occur with light of 185 nm of the low-pressure mercury lamp.

Also, ozone is generated with equation (5) of Equation 2 below, and active atomic oxygen can also be generated based on equation (6). It is considered that active atomic oxygen is mainly generated based on equation (4). Furthermore, since photon has energy of 696 kJ/mol, the capability of cutting the bond of the organic substance is advantageously higher. That is, since the energy is higher than molecular bond energies of almost all organic substances, the possibility of cutting a molecular bond is high. However, light of 172 nm has an oxygen absorption coefficient approximately 100 times larger compared with light of 185 nm of the low-pressure mercury lamp, and is strongly absorbed to oxygen. Therefore, the ozone and high-energy active atomic oxygen described above can cause an oxidation reaction only near the surface of the lamp and, disadvantageously, the effective irradiation distance in the air is extremely short, 0 mm to 3 mm (its critical irradiation distance is 8 mm).

[Equation 2]

$$O_2 + hu(172\text{ nm}) \rightarrow O(^1D) + O^3(P) \tag{4}$$

$$O(^3P) + O_2 \rightarrow O_3 \tag{5}$$

$$O_3 + hu(172\text{ nm}) \rightarrow O(^1D) + O_2 \tag{6}$$

h: blank constant, u: optical frequency,
O($^3$P): oxygen atom in a basal state,
O($^1$D): oxygen atom in an excited state The oxygen-containing atmospheric gas for use in the present invention include air, oxygen gas, or mixture gas of oxygen gas and nitrogen gas/inert gas (such as argon or helium), and air, which is inexpensive and easily available, is preferable. Also, the pressure of the atmosphere is not particularly restrictive, and either one of low pressure and high pressure will do. In view of convenience, atmospheric pressure is preferable.

Figure 3:
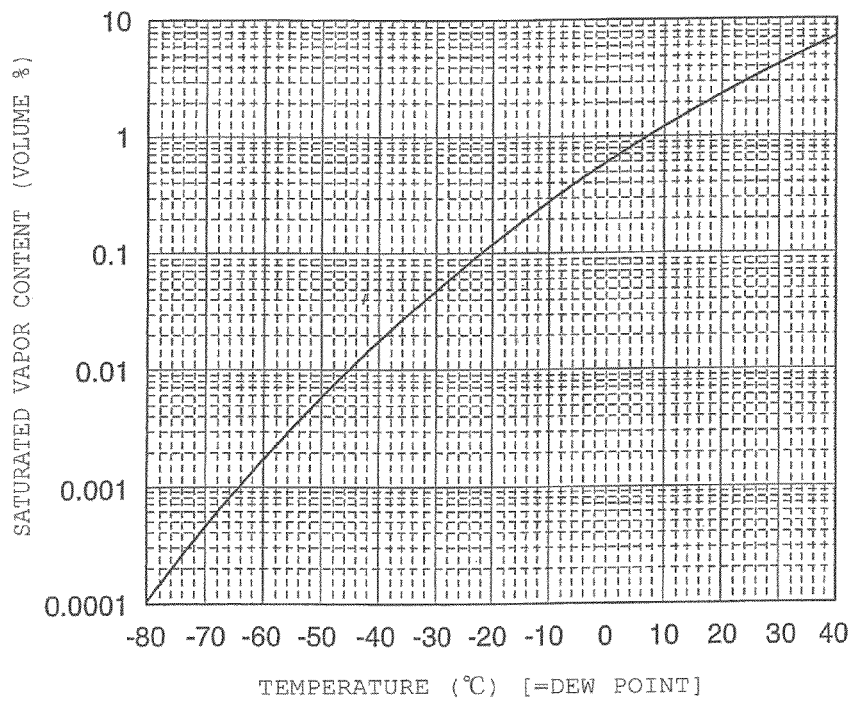
FIG. 3 is a drawing that shows a relation between a saturated vapor content (volume %) in the air and a dew point (° C.).

Furthermore, as its oxygen-containing atmospheric gas, an oxygen-containing atmosphere with a low dew point, that is, with a small vapor content (for reference, FIG. 3 shows a relation between a saturated vapor content (volume %) in the air and a dew point (° C.) is shown) is preferably used.

When this oxygen-containing atmosphere with a low dew point is used, in the course of mineralization of the film in the heat energy ray irradiating process crystallization of the conductive oxide at a nano level and crystal growth are suppressed, and a film structure of the conductive oxide fine-particle layer densely packed with extremely fine conductive oxide fine particles can be obtained. Note that the mechanism of dense packing of the conductive oxide fine particles can be thought as follows, although not having been necessarily clarified.

That is, it can be assumed that, at least until the time when crystallization of the conductive oxide at a nano level occurring due to mineralization in the heat energy ray irradiating process starts, the film structure is kept with the binder uniformly intervening in the conductive oxide. This film structure has flexibility with the action of the binder, which is an organic substance, to allow shrinkage (densification) of the film to the substrate and in a vertical direction. Therefore, when the temperature is increased and baking is performed under an air atmosphere with a low dew point, crystallization of the conductive oxide at a nano level is suppressed to the full extent possible in which the binder disappears and a shrinkable film structure can be taken, leading to densification of the film.

Note that under the air atmosphere with a low dew point, that is, with a small vapor content, why crystallization of the conductive oxide at a nano level and crystal growth are suppressed is not clear. However, for example, it can be thought that, water vapor in the air atmosphere has (1) an action of promoting thermal decomposition and burning (oxidation) of the binder components intervening in the conducive oxide, and (2) an action of promoting crystallization of the conductive oxide itself at a nano level and crystal growth.

This low dew point of the oxygen-containing atmospheric gas is preferably equal to or lower than −10° C., more preferably equal to or lower than −20° C., further preferably −30° C., and most preferably −40° C.

When the dew point exceeds −10° C., in the course of formation of the conductive oxide fine-particle layer made of extremely fine conductive oxide fine particles due to mineralization of the film in the heat energy ray irradiating process, water vapor promotes crystallization of the conductive oxide at a nano level and crystal growth at the stage in which much of the binder is still left. Therefore, the film structure with the binder uniformly intervening in the conductive oxide and shrinkable in a film vertical direction is destroyed, and the conductive oxide fine particles are adhered to each other and become unable to move, thereby inhibiting densification of the film. With this, the conductivity, film strength, resistance stability, and others of the transparent conductive film to be eventually obtained are degraded. Thus, this situation is not preferable.

Figure 4:
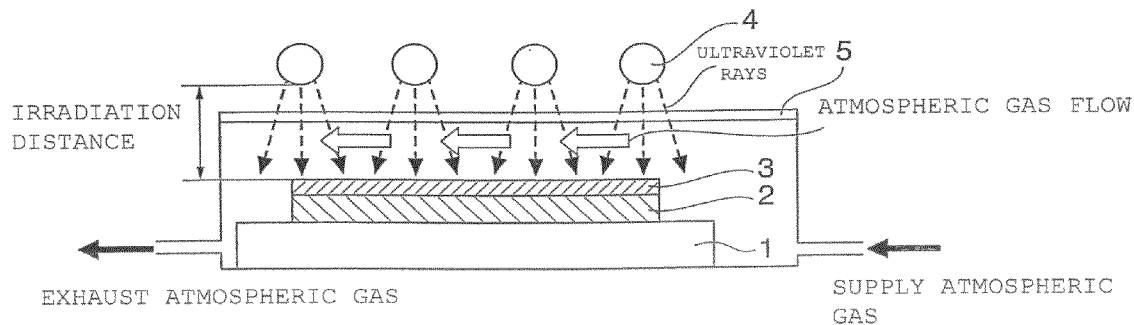
FIG. 4 is a schematic view showing another example of the heat energy ray irradiating process in the transparent conductive film manufacturing process with the coating method according to the present invention.

Examples of the heating apparatus for use in the heat energy ray irradiating process include a hot plate, a hot-air heating apparatus, and a far-infrared heating apparatus (for example, a halogen lamp heating apparatus), although not restrictive. However, for example, when gas having an oxygen concentration different from that of air or an atmosphere such as air with a low humidity, that is, a low dew point is used as the oxygen-containing atmosphere in the heat energy ray irradiating process, since the heating apparatus described above is desired to be able to control the atmosphere to be processed. For example, as shown in FIG. 4, a desirable structure is such that a substrate heating apparatus such as a hot plate is placed in a irradiation box having an ultraviolet ray irradiation window 5 of a synthetic quartz plate (having a high transmittance of ultraviolet rays having a wavelength equal to or smaller than 200 nm). Note that while the synthetic quartz window is suitable for the ultraviolet ray irradiation window 5, if the thickness of the irradiation window is required to be so thick, for example, if the required thickness is approximately 0.5 mm to 2 mm, a fused quartz plate (having a somewhat small transmittance of ultraviolet rays having a wavelength equal to or smaller than 200 nm) may be applied to the ultraviolet ray window 5 without particular problems. The material of the ultraviolet ray window 5 is not particularly restricted to quartz described above as long as it can let ultraviolet rays required as energy rays (for example, ultraviolet rays having a wavelength of 172 nm, or ultraviolet rays having a wavelength of 185 nm and a wavelength of 254 nm) pass therethrough.

(d) Plasma Processing Process

In the plasma processing process, plasma processing is performed on the inorganic film obtained in the previous energy ray irradiating process under a non-oxidizing gas atmosphere at a substrate temperature lower than 300° C. to further decompose a subtle amount of organic-based components left in the inorganic film to promote mineralization. At the same time, energy is provided to the film to promote crystallization to form an inorganic film made of a conductive oxide, in more detail, a transparent conductive film as a conductive oxide fine-particle layer densely packed with conductive oxide fine particles, with reinforced contacts between the conductive oxide fine particles.

Here, the substrate temperature in the plasma processing process indicates a temperature of the substrate to be heated by plasma with high energy (as described further below, for example, when ion components in microwave plasma are cut in ion trapping, the substrate may be heated by using a heating apparatus).

Figure 5:
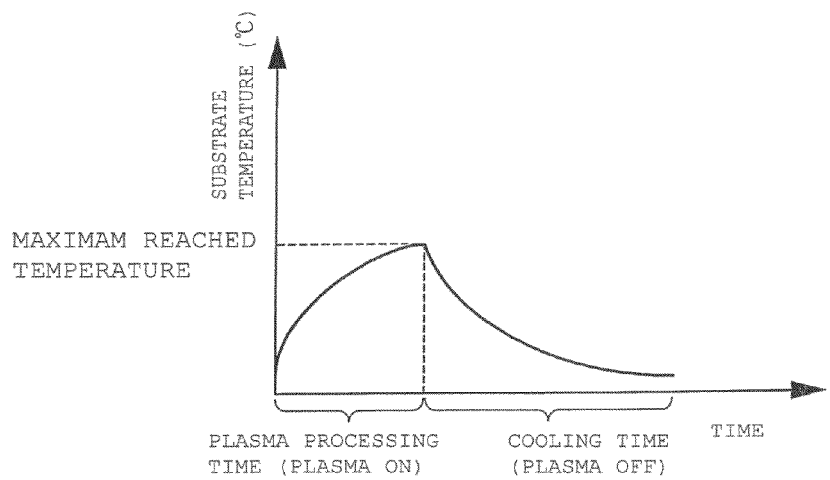
FIG. 5 is a schematic view showing substrate temperature transitions in a low-pressure plasma processing process under a decompressed non-oxidizing gas atmosphere in the transparent conductive film manufacturing process with the coating method according to the present invention.

FIG. 5 shows a relation between a typical plasma processing time and substrate temperature in the plasma processing process. The substrate temperature increases with plasma processing time from room temperature, and decreases when the plasma processing ends. In the present invention, performing plasma processing at a substrate temperature lower than 300° C. means that the maximum reached temperature of the substrate in FIG. 5 is lower than 300° C., and the processing temperature in the plasma processing process means this maximum reached temperature.

That is, in the plasma processing process, high-density plasma occurs as will be described further below. Therefore, when the substrate is heated, various chemical reactions are promoted simultaneously.

The plasma processing has a large effect of promoting crystallization with gas ions and excited electrons (active atoms) with high energy that are present in plasma, for example, nitrogen ions and active nitrogen, unlike molecules in a normal gas atmosphere. With this crystallization promoting effect, the processing has an action of reinforcing contacts between the conductive oxide fine particles and significantly increasing conductivity and resistance stability of the film. With this crystallization promoting effect of this plasma processing, a conductive oxide fine-particle layer is formed having a special structure densely packed with conductive oxide fine particles formed from microcrystals on the order of 5 nm to 20 nm as shown examples and with regions where crystal orientation of these conductive oxide fine particles being adjacent to each other. With a strong crystallization promoting effect, which is an action of plasma of plasma processing, the structure is considered to be formed in a manner such that, in crystallization and crystal growth of the film, crystal particles are first formed on a film surface and, at the same time, crystallization and crystal growth proceed from the film surface to a substrate side via contact portions between the crystal particles.

Note that the dopant concentration in the transparent conductive film also influences crystal growth. In general, lower dopant concentration facilitate crystal growth more. For this reason, in view of promotion of crystal growth, if the substrate temperature in the plasma processing process is low and crystal growth tends not to occur, the dopant concentration is required to be further decreased. For example, when a tin-doped indium oxide (ITO) is used for the transparent conductive film and the substrate temperature of the plasma processing process is low, approximately 150° C., the most preferable ratio of mixture of the tin oxide, which is a dopant metal compound, is 99:1 to 95:5 in terms of a molar ratio of indium to tin.

As described above, the plasma processing of the present invention has a feature in which a conductive oxide fine-particle layer having a structure with reinforced contacts between conductive oxide fine particles (bond of contact regions) can be obtained, and, therefore, in addition to an improvement in conductivity of the transparent conductive film, stability of resistance values can be significantly improved.

This plasma processing process can be broadly classified into two methods, depending on the pressure of the atmosphere to be processed: low-pressure plasma processing under a decompressed non-oxidizing gas atmosphere and atmospheric-pressure plasma processing under an atmospheric-pressure non-oxidizing gas atmosphere (also called "normal-pressure plasma processing"). In either of these plasma processings, densification of the conductive oxide fine-particle layer and an improvement in conductivity of the transparent conductive film described above can be achieved. Features of each plasma processing are described below.

[d-1] Low-Pressure Plasma Processing (to be Performed Under a Decompressed Non-Oxidizing Gas Atmosphere)

As plasma for use in the low-pressure plasma processing to be performed under a decompressed non-oxidizing gas atmosphere, microwave plasma or radio-frequency plasma can be thought, and either plasma can be applied.

In general, in low-pressure plasma processing, in order to stably form plasma, the pressure in an atmosphere for use is desirably approximately 2 Pa to 1000 Pa, preferably 3 Pa to 500 Pa.

First, low-pressure microwave plasma processing using microwave plasma is described. In general, microwave plasma becomes unstable when the atmospheric pressure is increased. Thus, for stable formation, the pressure in the atmosphere for use is desirably 2 Pa to 200 Pa, preferably 3 Pa to 20 Pa, and further preferably 3 Pa to 10 Pa.

If the pressure exceeds 200 Pa, it becomes difficult to form microwave plasma. At the same time, the life of presence of ions and active molecules in plasma becomes shortened to decrease ion concentration and active atomic concentration, thereby decreasing the crystallization promoting effect described above. Thus, this situation is not preferable. Also, if the pressure is smaller than 2 Pa, it similarly becomes difficult to form microwave plasma and ion concentration and active atomic concentration in plasma are decreased. Thus, this situation is not preferable, either.

Next, low-pressure radio-frequency plasma processing using radio-frequency plasma is described. To stably form radio-frequency plasma and provide the crystallization promoting effect described above, the pressure in the atmosphere for use is desirably 2 Pa to 1000 Pa, preferably 3 Pa to 500 Pa.

An example of the non-oxidizing gas atmosphere for use herein is an atmosphere containing at least one or more of nitrogen gas, inert gas (such as argon and helium), and reducing gas (such as hydrogen gas, ammonia gas, organic solvent vapor such as methanol).

The reason for this is as follows. To provide high conductivity to the transparent conductive film configured of the conductive oxide fine-particle layer obtained in the low-pressure plasma processing process, it is required to weakly reduce the film to form oxygen vacancies having a carrier forming action in the conductive oxide fine particles to increase carrier concentration. However, if the film is strongly reduced, for example, if the low-pressure plasma processing is excessively performed singly with hydrogen gas, oxygen vacancies in the transparent conductive film to be obtained are too large, thereby blackening the film and possibly reducing even the metal. Therefore attention should be paid.

As will be described further below, in the low-pressure microwave plasma processing, the chemical reaction speed is increased, and therefore the film tends to be blackened and reduction even to the metal tends to occur. Thus, a preferable non-oxidizing gas atmosphere is nitrogen gas. On the other hand, in the low-pressure radio-frequency plasma processing, chemical reactions tend not to occur, and therefore a preferable non-oxidizing gas atmosphere is hydrogen gas or mixture of hydrogen gas and another gas, such as nitrogen gas or inert gas, these gases having a stronger reducing power than that of nitrogen gas and capable of reducing the film to provide oxygen vacancies.

Note that since oxygen vacancies formed in the conductive oxide fine particles due to this reduction cause constituent elements (such as indium and oxygen) of the conductive oxide fine particles to easily diffuse, there is an effect of further promoting crystallization, in addition to promotion of crystallization by plasma energy. Therefore, this processing is also effective in improving conductivity of the transparent conductive film and stabilizing resistance (suppressing changes with time) described above.

As has been described so far, while the low-pressure plasma processing has an effect of further decomposing a subtle amount of organic-based components left in the inorganic film to promote mineralization, this action of decomposing the organic components is not large and, to the end, its main action is crystallization of the inorganic film and crystal growth.

Note that in the low-pressure plasma processing, as a decompressed gas atmosphere, the oxygen-containing atmosphere can be thought to have a larger effect of promoting mineralization by decomposition and burning (oxidation) of the organic-based components than that of the non-oxidizing gas atmosphere. Therefore, in view of promotion of mineralization of the transparent conductive film, a low-pressure plasma processing process under a decompressed non-oxidizing gas atmosphere can be inserted between the heat energy ray irradiating process under the oxygen-containing atmosphere and the low-pressure plasma processing process under the decompressed oxidizing gas atmosphere. Examples of the oxidizing gas atmosphere include air, oxygen gas and mixture gas of oxygen gas and nitrogen gas/inert gas (such as argon or helium).

As described above, since the low-pressure plasma processing further promotes mineralization of the inorganic film and crystallization proceeds at the same time, the thickness of the film is further decreased. For example, the inorganic film having a thickness of approximately 115 nm to 125 nm is decreased by the low-pressure plasma processing by approximately 20% to 30% to a thickness of approximately 90 nm to 105 nm.

Here, the control over the substrate temperature subjected to heating by plasma in the low-pressure plasma processing process can be adjusted as appropriate depending on, for example, a distance between the substrate and a plasma generating part (a irradiation distance), processing time, input energy (several hundreds of watts to several kilowatts), or cooling, heating, and others of the substrate. In low-pressure plasma processing on an entire surface of a large substrate, for example, parts for introducing energy (microwaves or radio frequencies) are equally arranged in a flat surface to form microwave plasma or radio-frequency plasma with a large area.

Figure 6:
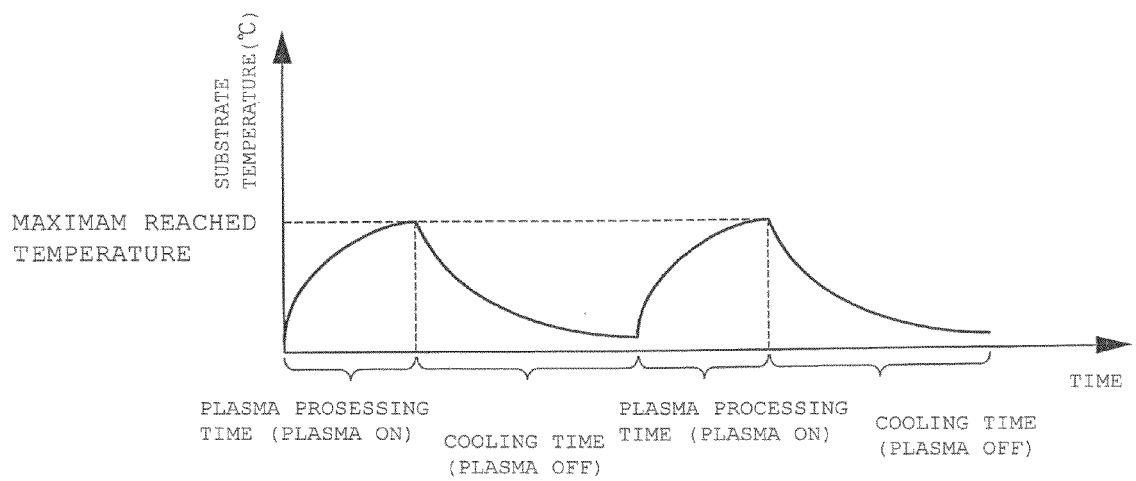
FIG. 6 is a schematic view showing another example of substrate temperature transitions in a low-pressure plasma processing process under a decompressed non-oxidizing gas atmosphere in the transparent conductive film manufacturing process with the coating method according to the present invention.

Furthermore, as a method of improving the characteristics of the transparent conductive film by extending the plasma processing time while suppressing an increase in substrate temperature in the low-pressure plasma processing process, as shown in FIG. 6, plasma processing may be intermittently performed to alternately perform substrate heating (plasma ON) and cooling (plasma OFF).

Of the low-pressure plasma processings, low-pressure microwave plasma is described in detail below with reference to the drawings.

Note that microwaves are electromagnetic waves having an extremely short wavelength, collectively referring to electric waves having a wavelength of approximately 3 cm to 30 cm (a frequency of 1000 MHz to 10000 MHz). Industrially, 2450 MHz and 915 MHz are used, and 2450 MHz is commonly used.

Figure 7:
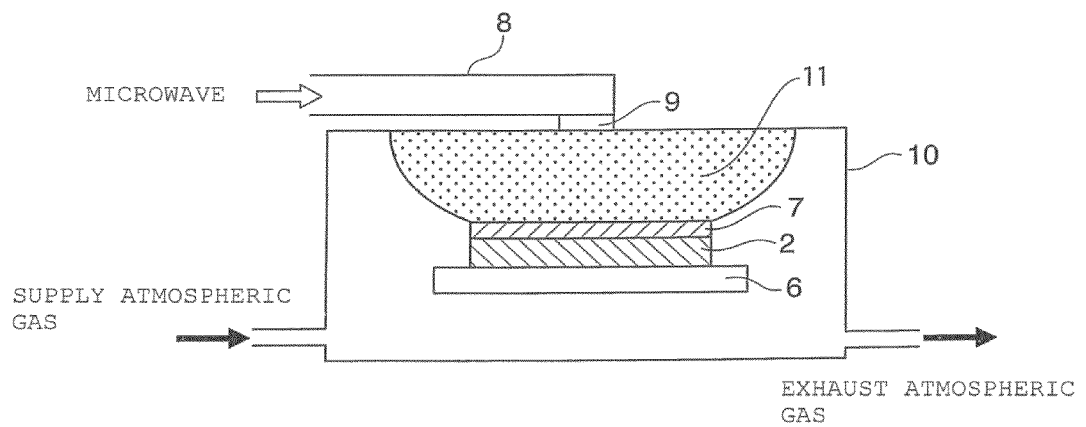
FIG. 7 is a schematic view showing an example of a low-pressure microwave plasma processing process under a decompressed non-oxidizing gas atmosphere in the transparent conductive film manufacturing process with the coating method according to the present invention.

FIG. 7 is a schematic view showing an example of a low-pressure microwave plasma processing process under a decompressed non-oxidizing gas atmosphere in the transparent conductive film manufacturing process with the coating method according to the present invention. As shown in FIG. 7, a microwave plasma 11 is generated normally by introducing a microwave having a frequency of 2450 MHz from a waveguide 8 through an introduction window 9 made of a material such as quartz that lets microwaves pass therethrough into a chamber 10 and ionizing and dissociating air molecules in the chamber 10. Therefore, in the plasma, air molecules and ions generated from the air molecules, atomic elements (atoms in a ground state), and radicals (excited atoms) are present in a mixed manner. For example, when nitrogen gas is used, molecule ($N_2$), ions ($N^+$ and $N_2^+$), atomic elements (N), and radicals (N) are generated. Thus generated plasma shields an electric field, and therefore its electric wave cannot enter the inside, but can propagate along the surface of the plasma as a surface wave. In an electric field of this electric wave, electrons are accelerated to supply energy to the plasma. Therefore, for example, under a gas pressure of 2 Pa to 200 Pa, microwave surface plasma can be obtained, which is high-density plasma of $10^{11}/cm^3$ to $10^{12}/cm^3$.

In general, while the plasma density is approximately $10^9/cm^3$ to $10^{10}/cm^3$ in radio-frequency plasma (RF plasma) often used, the microwave plasma has a feature of capable of increasing the chemical reaction speed by its high plasma density. Also regarding the electron temperature, while radio-frequency plasma (RF plasma) has an electron temperature equal to or larger than several eV, the microwave plasma 11 has a low electron temperature of approximately 1 eV, thereby decreasing thermal degradation occurring because the substrate is excessively heated. Furthermore, unlike the radio-frequency plasma (RF plasma), an electrodeless discharge occurs, and therefore no electrode is required inside the chamber and a simple structure can be achieved. With this, flexibility in designing the apparatus can be increased.

Here, the decompressed non-oxidizing gas atmosphere is obtained by placing a sample on a substrate support plate 6 in the chamber 10, once vacuumizing the inside the chamber 10 on the order of $10^{-5}$ Pa, and then introducing a predetermined non-oxidizing gas at a predetermined partial gas pressure.

In the low-pressure microwave plasma processing process, as described above, the substrate may be heated or cooled so that the substrate is controlled. Regarding a heating apparatus for the substrate, a hot plate, a far infrared heating apparatus, or the like can be used as the substrate support plate 6 in FIG. 7, but this is not meant to be restrictive. Also, when an increase in substrate temperature is desired to be suppressed, a method can be thought in which the substrate is held in close contact onto the substrate support plate 6 (made of a material with high thermal conductivity such as copper) forcibly cooled by, for example, a water-cooling jacket or the like, and low-pressure microwave plasma processing is performed while heat is being removed from the substrate.

Figure 8:
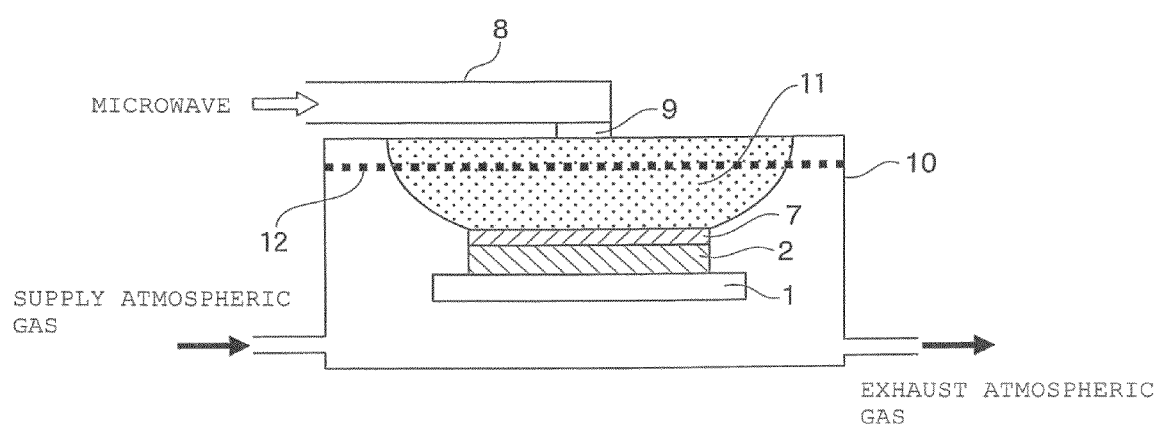
FIG. 8 is a schematic view showing another example of the low-pressure microwave plasma processing process under a decompressed non-oxidizing gas atmosphere in the transparent conductive film manufacturing process with the coating method according to the present invention.

Note that an ion trap 12 for cutting ion components in the microwave plasma may be placed as shown in FIG. 8. As the ion trap 12, for example, a punching metal plate with small holes can be used. Since the ion components are trapped in the ion trap 12 (punching metal plate), an inorganic film 7 is irradiated with only the atomic element and the radical components in the microwave plasma.

On the other hand, in the low-pressure microwave plasma processing, since irradiation with ion components mainly increases the temperature of the substrate. Therefore, if the ion trap 12 as described above is used, the substrate temperature becomes less prone to be increased. For example, the substrate temperature is merely increased to several tens of degrees. Therefore, in the low-pressure microwave plasma processing using the ion trap 12, to increase the substrate temperature to, for example, 100° C. or higher, the heating apparatus as used in the heat energy ray irradiating process described above is required to be used together. Note that, as with the low-pressure microwave plasma processing without ion cut, irradiation of the heated inorganic film 7 with the atomic elements and radical components has an action of modifying the inorganic film (crystallization and crystal growth).

In the low-pressure microwave plasma processing process by using irradiation with microwave plasma with ion components being cut and substrate heating, the action of modifying the inorganic film (crystallization and crystal growth) and substrate heating can be separately controlled, and therefore the temperature of the substrate can be easily controlled. Also, since the temperature distribution of the substrate can be made more uniform, the entire low-pressure microwave plasma processing process can be easily controlled. In addition, since the processing time can be set long (for example, several minutes to several tens of minutes), a further improvement in film characteristics can be expected.

Next, of the low-pressure plasma processings, low-pressure radio-frequency plasma processing is described in detail with reference to the drawings.

Note that radio-frequency waves of radio-frequency plasma are electromagnetic waves having a wavelength of a radio frequency (RF), collectively referring to electric waves having a wavelength of approximately 1 m to 100 km (a frequency of 3 kHz to 300 MHz). Industrially, 13.56 MHz, 27.12 MHz, 40.68 MHz, and others are used, and 13.56 MHz is commonly used.

Figure 9:
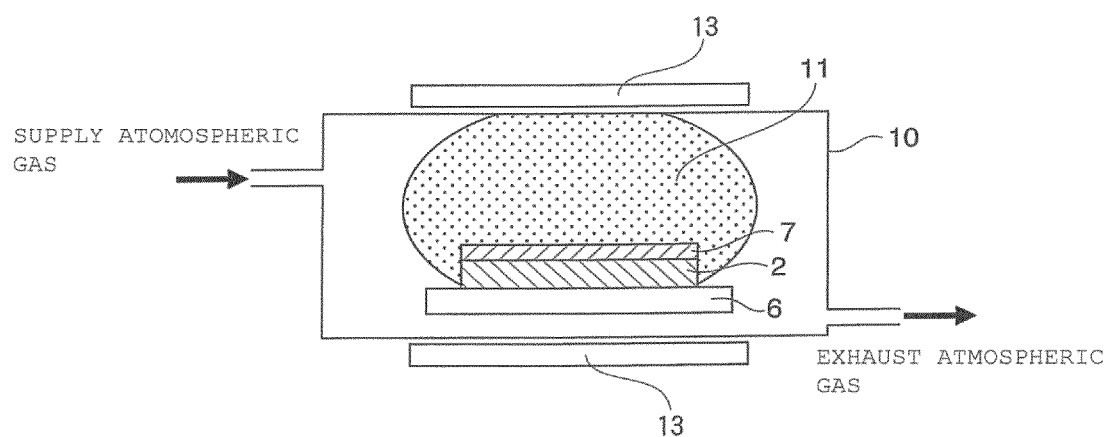
FIG. 9 is a schematic view showing another example of a low-pressure radio-frequency plasma processing process under a decompressed non-oxidizing gas atmosphere in the transparent conductive film manufacturing process with the coating method according to the present invention.

FIG. 9 is a schematic view showing an example of a low-pressure radio-frequency plasma processing process under a decompressed non-oxidizing gas atmosphere in the transparent conductive film manufacturing process with the coating method according to the present invention. As shown in FIG. 9, a radio-frequency plasma 11 is generated by applying radio-frequency waves normally having a frequency of 13.56 MHz to electrodes for plasma generation 13 having a chamber 10 interposed therebetween, the chamber being made of a material that lets the high frequency (such as borosilicate glass, non-alkali glass, or quartz glass) and ionizing and dissociating air molecules in the chamber 10. Therefore, in the plasma 11, air molecules and ions generated from the air molecules, atomic elements (atoms in a ground state), and radicals (excited atoms) are present in a mixed manner.

In general, while the plasma density is approximately $10^9/cm^3$ to $10^{10}/cm^3$ in radio-frequency plasma (RF plasma) often used, which is somewhat lower than the plasma density of the microwave plasma, there is an advantage in which the structure of the apparatus is simple and low manufacturing cost can be achieved.

Here, the decompressed non-oxidizing gas atmosphere can be obtained by placing a sample on the substrate support plate 6 in the chamber 10, once vacuumizing the inside the chamber 10 on the order of $10^{-5}$ Pa to several tens of Pa, and then introducing a predetermined non-oxidizing gas at a predetermined partial gas pressure.

In the low-pressure radio-frequency plasma processing process, as described above, the substrate may be heated or cooled so that the substrate is controlled. Regarding a heating apparatus for the substrate, a hot plate, a far infrared heating apparatus, or the like can be used as the substrate support plate 6 in FIG. 9, but this is not meant to be restrictive. Also, when an increase in substrate temperature is desired to be suppressed, a method can be thought in which the substrate is held in close contact onto the substrate support plate 6 (made of a material with high thermal conductivity such as copper) forcibly cooled by, for example, a water-cooling jacket or the like, and low-pressure radio-frequency plasma processing is performed while heat is being removed from the substrate.

As described above, the low-pressure plasma processing has a large effect in densifying the conductive oxide fine-particle layer and improving conductivity of the transparent conductive film by utilizing the fact that, for example, the chemical reaction speed is large due to its high plasma density. On the other hand, however, since the plasma processing is performed under low pressure, a vacuum container (chamber 10) as shown in FIG. 7 and FIG. 8 is required, thereby disadvantageously increasing the price of a plasma processing apparatus. Furthermore, the atmospheric pressure is required to be changed to a vacuum atmosphere every time a substrate to be processed is delivered to and discharged from the vacuum container, thereby causing a complex process procedure. Also, a total processing time (a tact time) is increased to decrease the throughput.

An atmospheric-pressure plasma processing to be performed under an atmospheric-pressure non-oxidizing gas atmosphere described below is a plasma processing method that can address these problems.

[d-2] Atmospheric-Pressure Plasma Processing (to be Performed Under an Atmospheric-Pressure Non-Oxidizing Gas Atmosphere) (Normal-Pressure Plasma Processing)

Figure 10:
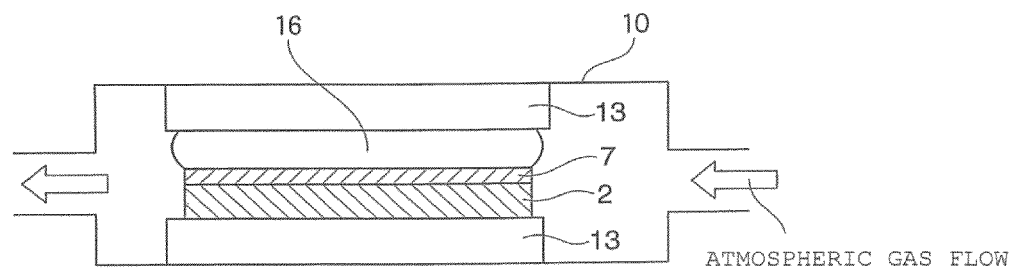
FIG. 10 is a schematic view showing an example of an atmospheric pressure plasma processing process under an atmospheric non-oxidizing gas atmosphere in the transparent conductive film manufacturing process with the coating method according to the present invention.
Figure 11:
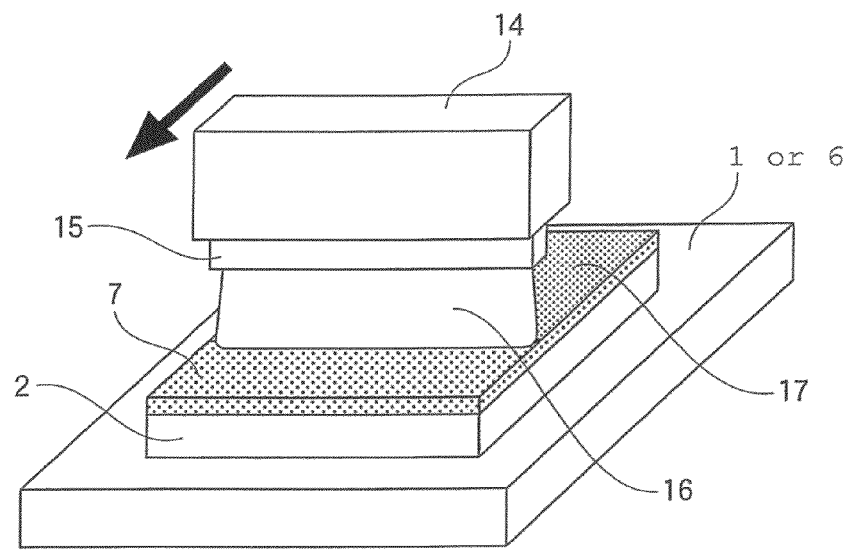
FIG. 11 is a schematic view showing another example of the atmospheric pressure plasma processing process under the atmospheric non-oxidizing gas atmosphere in the transparent conductive film manufacturing process with the coating method according to the present invention.

In the atmospheric-pressure plasma processing to be performed under an atmospheric-pressure non-oxidizing gas atmosphere, as shown in FIG. 10 and FIG. 11. Plasma is generated in an atmospheric-pressure atmospheric gas and the inorganic film 7 is processed with that generated gas (plasma gas 16). As with the low-pressure microwave plasma processing to be performed the decompressed non-oxidizing gas atmosphere described above, with the action of modifying the inorganic film (crystallization and crystal growth) with ions, atomic elements, and radical components in the plasma, the conductive oxide fine-particle layer can be densified, and the conductivity of the transparent conductive film can be improved.

FIG. 10 shows a method in which the substrate 2 having the inorganic film 7 obtained in the heat energy ray irradiating process is interposed between the electrodes for plasma generation 13 to form a plasma gas (atmospheric pressure) 16 straight above the inorganic film 7 for plasma processing. On the other hand, FIG. 11 shows a method in which a plasma gas (atmospheric pressure) 16 is generated by a plasma generating apparatus 14 and is sprayed from a plasma gas discharge nozzle 15 over the inorganic film 7 on the substrate 2 to obtain the transparent conductive film 17 subjected to plasma processing. In the latter method, the plasma gas discharge nozzle 15 is in a narrow pipe shape. With this, the plasma gas 16 can be sprayed only to an arbitrary portion on the inorganic film 7, thereby obtaining a patterned transparent conductive film 18 subjected to selective plasma processing.

The plasma of the atmospheric-pressure plasma processing may be a microwave plasma or a radio-frequency plasma. Also, as with the case of the low-pressure microwave plasma processing described above, an example of the non-oxidizing gas atmosphere is an atmosphere containing at least one or more of nitrogen gas, inert gas (such as argon and helium), and reducing gas (such as hydrogen gas, ammonia gas, organic solvent vapor such as methanol). A preferable non-oxidizing gas atmosphere is nitrogen gas or a mixture gas obtained by mixing hydrogen gas or ammonia gas into nitrogen gas.

Note that the substrate is preferably heated or cooled as required so that its temperature is in a predetermined range. In the atmospheric-pressure plasma processing under the atmospheric-pressure non-oxidizing gas atmosphere, heat transfer to the substrate easily occurs compared with the processing under low pressure. Therefore, the substrate temperature can be relatively easily controlled, and the temperature distribution of the substrate can be made more uniform. Thus, the entire plasma processing process can be easily controlled. Also, as described above, since a vacuum container is not required, there are advantages such that the plasma processing apparatus is inexpensive, the process is also simple, and further the throughput of the substrate can be increased to achieve excellent productivity.

[e] Heating Process

Meanwhile, in the present invention, subsequently to the plasma processing, a heating process under a neutral atmosphere or a reducing atmosphere (that is, a non-oxidizing gas atmosphere) may be performed as required. With this heating process, oxygen vacancies are formed in the conductive oxide fine particles to increase carrier concentration, thereby possibly improving conductivity of the transparent conductive film. An example of the heating process method is performed by using a hot-air heating apparatus or a halogen lamp heating apparatus.

Note that in this heating process under the neutral atmosphere or the reducing atmosphere, the oxygen vacancies formed in the film make the constituent elements (such as indium and oxygen) of the conductive oxide fine particles easily diffuse to promote crystal growth. Therefore, not only an improvement in conductivity of the transparent conductive film but also resistance stabilization (suppression of changes with time) can be expected.

This neutral atmosphere is formed from one or more of nitrogen gas or inert gas (such as argon and helium), and an example of the reducing atmosphere is an hydrogen gas atmosphere or an atmosphere containing at least one or more of hydrogen or organic solvent vapor (organic gas such as methanol) in the neutral atmosphere. These atmospheres are not restrictive to the above, however, as long as they allow removal of oxygen atoms from the densely-packed conductive oxide fine particles to form oxygen vacancies to increase conductive carrier concentration. And, if the heating temperature is lower than 300° C., a mixture gas obtained by mixing 0.1% to 7% (volume %) (more preferably, 0.5% to 4%) of hydrogen gas in nitrogen gas or inert gas is a preferable atmosphere because there is no danger of explosion even if the gas leaks to the atmosphere.

The heating conditions in the heating process under the neutral atmosphere or the reducing atmosphere are such that the heating process temperature is equal to or higher than 150° C. and lower than 300° C., more preferably equal to or higher than 200° C. and lower than 300° C., for 5 minutes to 120 minutes, more preferably 15 minutes to 60 minutes. Note that in view of further promotion of crystal growth between the conductive oxide fine particles described above, the heating process temperature is desirably equal to or higher than 250° C. and lower than 300° C.

If the heating process temperature is lower than 150° C., oxygen vacancies are not sufficiently formed in the conductive oxide fine particles, and an improvement in conductivity of the transparent conductive film with an increase in carrier concentration cannot be expected.

As described above, in addition to a function of forming oxygen vacancies in the conductive oxide to increase the carrier concentration, the heating process under the neutral atmosphere or the reducing atmosphere has a function of make the constituent element of the transparent conductive film easily move with the presence of the oxygen vacancies to promote crystal growth. Therefore, depending on the condition, the strength and conductivity of the transparent conductive film may be further improved.

Figure 13:
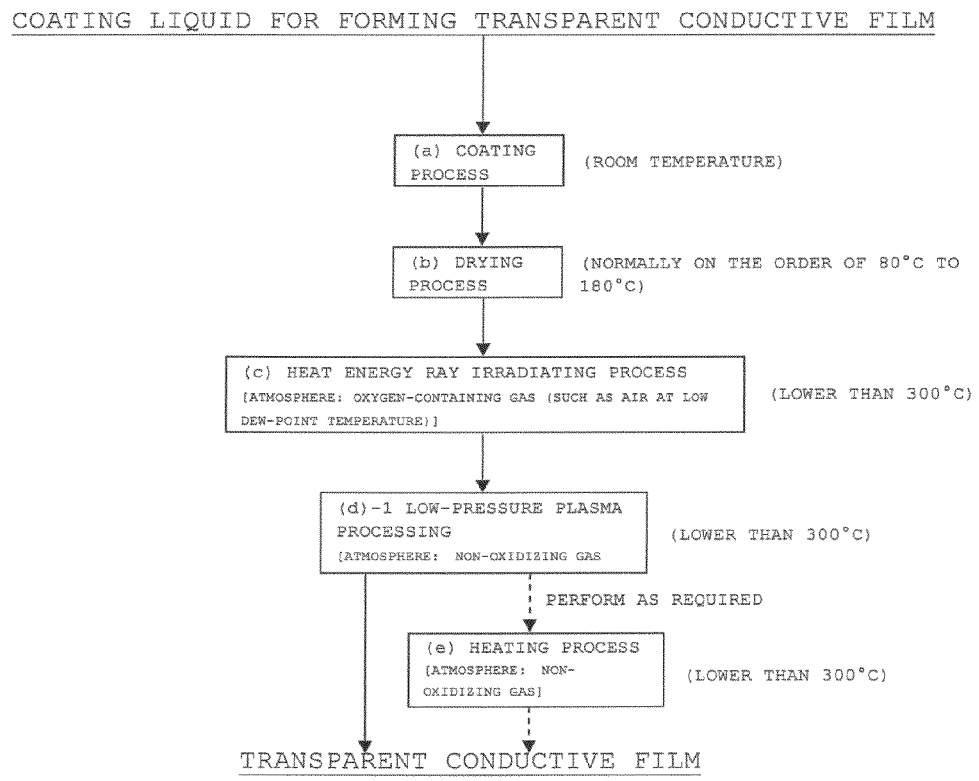
FIG. 13 is a drawing that shows an example of a transparent conductive film manufacturing flow with the coating method according to the present invention.
Figure 14:
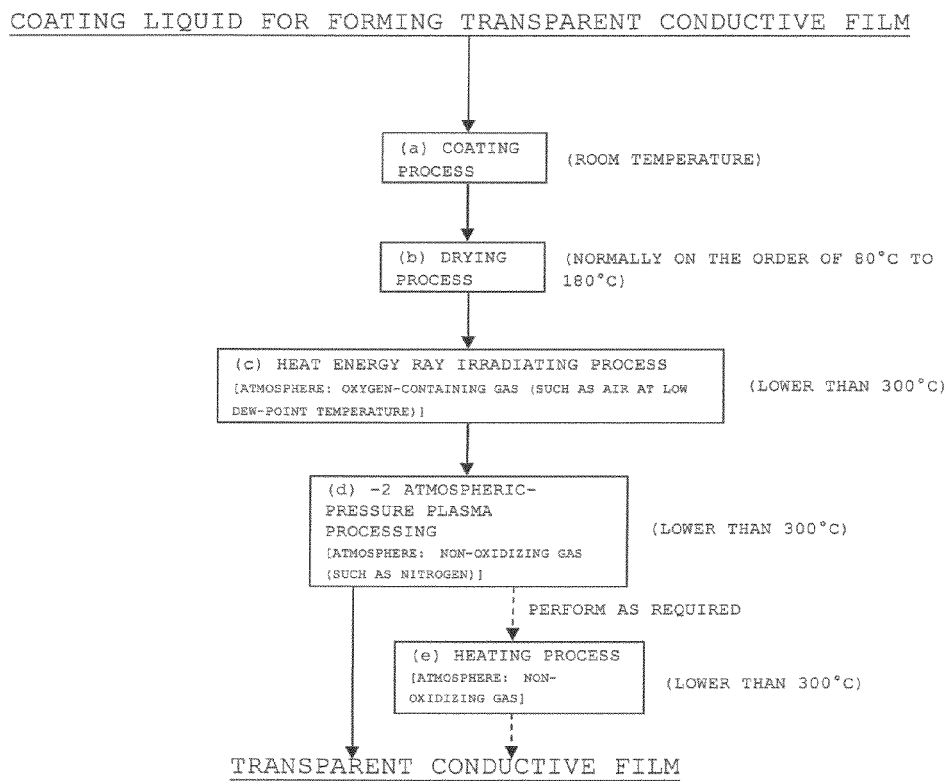
FIG. 14 is a drawing that shows another example of a transparent conductive film manufacturing flow with the coating method according to the present invention.

Here, the process of manufacturing the transparent conductive film of the present invention is shown in FIG. 13 and FIG. 14 for ease of understanding. FIG. 13 shows a method of performing low-pressure plasma processing process subsequently to the heat energy ray irradiating process, and FIG. 14 shows a method of performing an atmospheric-pressure plasma processing process subsequently to the heat energy ray irradiating process.

Next, a thin-film transistor element to which the transparent conductive film of the present invention is applied is described.

An example of the thin-film transistor element (TFT element) is a field-effect transistor element having a coplanar-type structure or a staggered-type structure. In either structure, although details are omitted, the element is provided with a source/drain electrode, a gate insulating film, a channel active layer, and a gate electrode on a substrate.

The thin-film transistor element is used as a driver element in displays such as a liquid-crystal display of an active matrix type and an electroluminescent display, which will be described further below, and in an image sensor.

As described above, amorphous silicon has been widely used so far as a channel active layer of the thin-film transistor. However, amorphous silicon has a disadvantage of low carrier mobility and instability in characteristics at the time of continuous driving. Thus, with the aim of achieving better element characteristics (such as high mobility, low threshold voltage, high ON/OFF ratio, low S value, and normally off), attempts have been made such that an amorphous conductive oxide (oxide semiconductor) such as In—Ga—Zn—O base (InGaZnO$_4$) is applied to the channel active layer.

In the transparent conductive film obtained by the present invention, a (amorphous) conductive oxide fine-particle layer densely packed with conductive oxide fine particles having a metal oxide as a main component is formed. Therefore, for example, an amorphous conductive oxide layer (oxide semiconductor layer) such as InGaZnO$_4$ described above applicable to a channel active layer of a thin-film transistor can be formed with heating at a low temperature lower than 300° C.

Next, the transparent conductive film and the device to which the transparent conductive film is applied of the present invention are described.

Examples of this device include light-emitting devices such as an LED element, an electroluminescent lamp (an electroluminescent element), and a field emission lamp; electric power generating devices such as a solar cell; display devices such as a liquid-crystal display (a liquid-crystal element), an electroluminescent display (an electroluminescent element), a plasma display, and an electric paper element; and input devices such as a touch panel. The transparent conductive film and the transparent conductive substrate of the present invention are suitable for these transparent electrodes.

Several devices are described below.

Here, electroluminescent elements as light-emitting devices include an organic EL element using an organic light-emitting material and an inorganic EL element using an inorganic light-emitting material. In recent years, the organic EL element has attracted attention.

This organic EL element is a self-emitting element, unlike a liquid-crystal display element, and high luminance can be obtained with low voltage driving, and therefore is expected as a display apparatus such as a display. The organic EL element is classified into a low-molecular type and a high-molecular type. An example of structure of the high-molecular type is such that a positive-hole injection layer formed form a conductive polymer such as a polythiophene derivative (hole injection layer), an organic light-emitting layer (a polymer light-emitting layer formed by coating), a cathode electrode layer [a metal layer with excellent electron injectability to the light-emitting layer and low work function, such as magnesium (Mg), calcium (Ca), or aluminum (Al)], and then a gas barrier coating layer (or a process of sealing with a metal or glass) are sequentially formed on a transparent conductive film as an anode electrode layer. The gas barrier coating layer described above is required to prevent degradation of the organic EL element, and oxygen barrier and water vapor barrier are desired. For example, as for water vapor, extremely high barrier performance with a moisture vapor transmission rate being approximately equal to or lower than $10^{-5}$ g/m$^2$/day is required, and the inside of the organic EL element (device) is configured to be completely sealed from outside.

The solar cell as an electric power generating device is an electric power generating element that converts sunbeams to electric energy. Examples of the solar cell include a silicon solar cell (of a thin film type, a fine crystal type, and a crystal type), a CIS solar cell (a copper-indium-selenium thin-film), a CIGS solar cell (a copper-indium-gallium-selenium thin-film), and a dye-sensitized solar cell. For example, in the silicon solar cell, a transparent electrode, a semiconductor electric power generating layer (silicon), and then a metal electrode are sequentially formed on a transparent substrate.

The liquid-crystal element as a display device is an electronic display element of a non-light-emitting type widely used in displays of portable phones, PDAs (Personal Digital Assistants), PCs (Personal Computers), and others, and is classified into a simple matrix type (a passive matrix type) and an active matrix type. In view of image quality and response speed, the active matrix type is superior.

The basic structure is such that a liquid crystal is interposed between transparent electrodes (each corresponding to the transparent conductive film of the present invention), and liquid-crystal molecules are oriented by voltage driving for display. In an actual element, in addition to the transparent electrodes, a color filter, a retardation film, a polarizing film, and others are further laminated for use.

Also, liquid-crystal elements of another type also include a polymer dispersed liquid crystal element (hereinafter abbreviated as a PDLC element) used for an optical shutter such as a window or others and a polymer network liquid crystal element (hereinafter abbreviated as a PNLC element).

In either liquid crystal, the basic structure is as described above, such that a liquid crystal layer is interposed between electrodes (at least one is a transparent electrode, which corresponds to the transparent conductive film of the present invention), and liquid-crystal molecules are oriented by voltage driving for display to cause a change in appearance of the liquid-crystal layer as transparent/opaque. Unlike the liquid-crystal display element described above, however, there is a feature in which no phase difference film or polarizing film is required in an actual element, thereby simplifying the element structure.

Meanwhile, the PDLC element adopts a structure in which liquid crystal microcapsulated in a polymer resin matrix is dispersed, and the PNLC element adopts a structure in which a netted portion of a resin netted network is packed with liquid crystal. In general, the PDLC element has a high resin content ratio in the liquid-crystal layer, and therefore an alternating current driving voltage equal to or higher than several tens of volts (for example, on the order of 80 V) is required. By contrast, the PNLC element, where the resin content ratio of the liquid-crystal layer can be low, has a feature in which it can be driven with an alternating current on the order of several V to 15 V.

Note that to ensure display stability of the liquid-crystal element, it is required to prevent water vapor from being mixed into the liquid crystal. For example, the moisture vapor transmission rate is required to be equal to or lower than 0.01 $g/m^2/day$, and the inside of the liquid-crystal element (device) is configured to be completely sealed from outside.

The electronic paper element as a display device is an electronic display element of a non-light-emitting type, which does not emit light by itself, includes a memory effect in which a display is left as it is even if powered off, and is expected to be as a display for character display.

Examples of this display type that have been developed include an electrophoretic type in which coloring particles are moved in liquid between electrodes by electrophoresis; a twist ball type in which dichroic particles are rotated in an electric field for coloring; a liquid crystal type in which, for example, cholesteric liquid crystal is interposed between transparent electrodes for display; a powder base type in which coloring particles (toner) or electronic liquid powder (Quick Response Liquid Powder) are moved in the air for display; an electrochromic type in which coloring is performed based on electrochemical oxidation and reduction; and an electrodeposition type in which a metal is precipitated and dissolved by electrochemical oxidation and reduction and accompanying changes in color are used for display. In any of these types, the structure is such that a display layer is interposed between a transparent conductive film (transparent electrode) and a counter electrode.

Note that, to ensure display stability in the electronic paper elements of these various types, it is required to prevent water vapor from being mixed into the display layer. Although it depends on the type, for example, the moisture vapor transmission rate is required to be equal to or lower than 0.01 $g/m^2/day$, and the inside of the electronic paper element (device) is configured to be completely sealed from outside.

The touch panel is a position input element, and there are a resistive type, a capacitive type, and others.

For example, the resistive touch panel has a structure in which two transparent conductive substrates as coordinate-detection resistive films for detecting coordinates are laminated together via a dotted transparent spacer. In the transparent conductive substrates, depression durability is required. In the transparent conductive film, flexibility without causing a crack is demanded. Also, in the capacitive type, with an increased resolution, a further improvement in conductivity of the transparent conductive film is demanded.

In any of the light-emitting device, the electric power generating device, the display device, the input device, and others described above, an improvement in device characteristics is demanded. By applying the transparent conductive film and the transparent conductive substrate according to the present invention to a transparent electrode of these devices, the basic device characteristics can be further improved, and therefore, such application can significantly contribute to, for example, energy saving and size reduction of the device and others.

The present invention is described in detail below by using examples, but the present invention is not meant to be restricted to these examples.

Example 1

Formulation of Solution Liquid A 40 g of indium acetylacetonate In(C5H7O2)3 (molecular weight=412.15), 42 g of p-tert-butylphenol, 14 g of dibasic acid ester (manufactured by Du Pont Japan), and 4 g of hydroxypropylcellulose (HPC) were mixed together, heated to 130° C., and agitated for ninety minutes for dissolution. Next, 25 g of the obtained solution, 25 g of cyclohexanone, 10 g of propylene glycol monomethyl ether (PGM), and 40 g of methyl ethyl ketone (MEK) were mixed together and agitated well until they became uniform, thereby formulating an solution (liquid A) containing indium acetylacetonate and hydroxypropylcellulose.

[Formulation of Solution Liquid B]

40 g of tin acetylacetonate (standard nomenclature: di-n-butyl bis(2,4-pentanedionato) tin: $[Sn(C_4H_9)_2(C_5H_7O_2)_2]$) (molecular weight=431.14), 42 g of p-tert-butylphenol, 14 g of dibasic acid ester (manufactured by Du Pont Japan), and 4 g of hydroxypropylcellulose (HPC) were mixed together, heated to 130° C., and agitated for ninety minutes for dissolution. Next, 25 g of the obtained solution, 25 g of cyclohexanone, 10 g of propylene glycol monomethyl ether (PGM), and 40 g of methyl ethyl ketone (MEK) were mixed together and agitated well until they became uniform, thereby formulating an solution (liquid B) containing tin acetylacetonate and hydroxypropylcellulose.

[Formulation of the Coating Liquid]

9.1 g of the formulated liquid A and 0.9 g of the formulated liquid B were agitated well until they become uniform, thereby formulating a coating liquid for forming transparent conductive film containing 10 weight % of indium acetylacetonate and tin acetylacetonate in total and 1 weight % of hydroxypropylcellulose.

[Fabrication of the Coating Conductive Film]

With this coating liquid for forming transparent conductive film, spin coating (1000 rpm×60 sec) was performed on an entire surface of a no-alkali glass substrate (5 cm×5 cm×thickness of 0.7 mm; visible light transmittance=91.2%, haze value=0.26%) at 25° C., and then the surface was dried in the atmosphere at 150° C. for ten minutes, thereby obtaining the dried coating film 3 (film thickness: 580 nm, surface resistivity: >1×10$^{13}$ Ω/sq [insulated state]). Ω/sq is a unit indicating a surface resistivity, and reads to ohm per square.

The substrate 2 having this dried coating film 3 was placed on the hot plate 1 as shown in FIG. 4, and its temperature was increased to 150° C. (temperature increasing speed: 30° C./minute). In the state where 150° C. was kept while low-humidity air having a dew point of −50° C. was being supplied between the ultraviolet ray irradiation window 5 (synthetic quartz plate having a thickness of 2 mm) and the substrate, irradiation of heat energy rays from the low-pressure mercury lamp for twenty minutes was performed to promote mineralization of the dried coating film (decomposition or burning of organic components), thereby obtaining an inorganic film (film thickness: 115 nm, surface resistivity: $5\times10^{12}$ Ω/sq).

Note that the irradiation distance between the low-pressure mercury lamp and the substrate was 10.5 mm, illuminance of light of 254 nm was approximately 20 mW/cm$^2$, and estimated illuminance of light of 185 nm was approximately 5 mW/cm$^2$. Furthermore, a space between the substrate and the ultraviolet ray irradiation window 5 was 3.5 mm, and the average velocity of flow of the atmospheric gas flowing there between was approximately 0.57 m/sec.

Next, as shown in FIG. 7, the substrate 2 having the inorganic film 7 was placed on the substrate support plate (a copper plate having a thickness of 3 mm) 6 having an action of cooling the glass substrate in the chamber 10. After the inside of the chamber 10 was vacuumized (approximately 10$^{-3}$ Pa), while nitrogen gas as an atmospheric gas was being supplied so as to achieve a partial pressure of 5 Pa, microwaves (output: 1400 W) having a frequency of 2450 MHz were introduced from the waveguide 8 via the quartz-made introduction window 9 into the chamber 10 to generate microwave plasma 11. Microwave plasma processing was then performed for 1.0 minute (60 seconds) to further promote mineralization of the inorganic film 7 (decomposition or burning of organic components) and also promote a film reducing process (introducing oxygen vacancies into the film) and crystallization, thereby fabricating the transparent conductive film (film thickness: 103 nm) according to Example 1. Note that the substrate temperature reached 260° C. during microwave plasma processing (maximum reached temperature=260° C.)

Also, in FIG. 7, the distance between the substrate and the quartz-made introduction window was approximately 7 cm.

Next, various characteristics including surface resistivity, haze value, visible light transmittance, transparent conductive film thickness, crystallite size, and pencil hardness of the fabricated transparent conductive film were measured, and the results is shown in Table 1.

Figure 15:
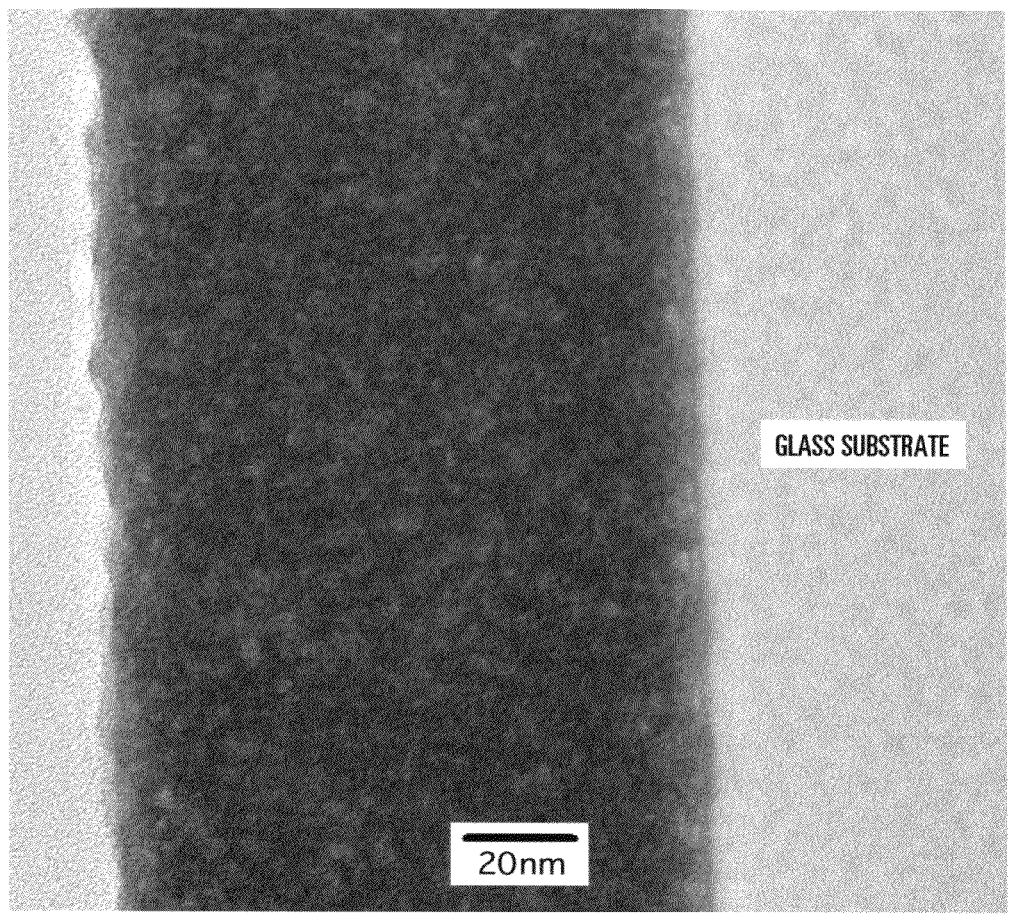
FIG. 15 shows a transmission electron microscope photograph (a TEM image) of a cross section of a transparent conductive film according to Example 1.
Figure 16:
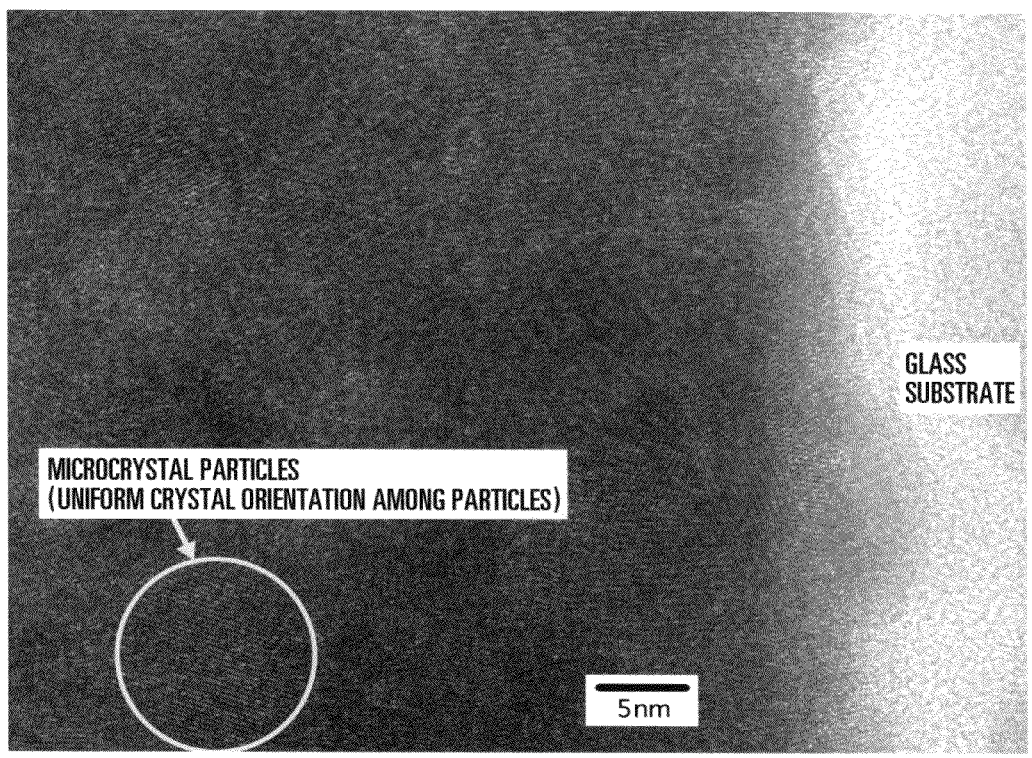
FIG. 16 shows a transmission electron microscope photograph (a TEM image) of a partially-enlarged cross section of the transparent conductive film according to Example 1.
Figure 17:
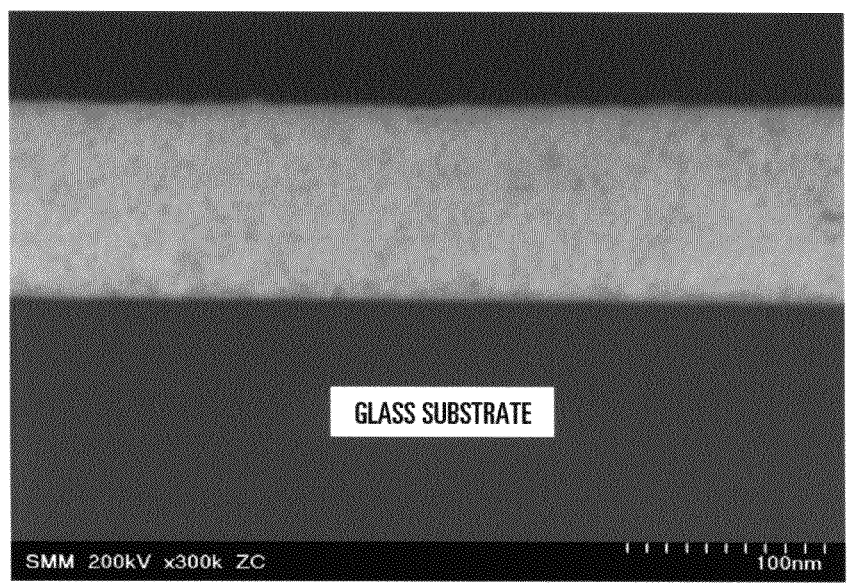
FIG. 17 shows a Z contrast image of the cross section of the transmission conductive film according to Example 1.

Furthermore, transmission electron microscope photographs (TEM images) of a cross section and a partial cross section of the transparent conductive film of Example 1 observed by a transmission electron microscope are shown in FIG. 15 and FIG. 16, respectively. Also, a Z contrast image of the cross section of the transparent conductive film of Example 1 observed by the transmission electron microscope is shown in FIG. 17. In the Z contrast image, heavy elements are shown as bright, and therefore an ITO portion appears bright.

From FIG. 15 to FIG. 17, it can be found that the transparent conductive film is configured of a conductive oxide fine-particle layer densely packed with conductive oxide fine particles formed with ITO microcrystals on the order of 5 nm to 10 nm and ITO microcrystals (amorphous) equal to or smaller than 3 nm mixed together.

Note that this Z contrast image is a high-angle annular dark field: HAADF) image, which is obtained by detecting inelastic scattering electrons scattered at a large angle when electrons pass through the sample for imaging, and the detection intensity is proportional to the square of the atomic number.

The surface resistivity of the transparent conductive film was measured by using a surface resistivity meter Loresta AP manufactured by Mitsubishi Chemical Corporation.

The haze value and the visible light transmittance were measured by using a haze meter (NDH 5000) manufactured by Nippon Denshoku Industries Co., Ltd., based on JIS K 7136 (haze value) and JIS K 7361-1 (transmittance).

The film thickness was measured by using a stylus-type film thickness meter (Alpha-Step IQ) manufactured by KLA-Tencor Corporation.

The crystallite size was found by performing an X-ray diffraction measurement, and the (222) peak of indium oxide (In$_2$O$_3$) was found by the Scherrer method.

The pencil hardness was measured based on JIS K 5400.

Note that the visible light transmittance and the haze value are values only for the transparent conductive film, and each was found from Equations 3 and Equation 4 below.

$$\text{Transmittance of a transparent conductive film (\%)} = \frac{\text{Transmittance of a substrate together with the transparent conductive film formed thereon}}{\text{Transmittance of only the substrate}} \times 100 \quad \text{[Equation 3]}$$

$$\text{Haze value (\%) of a transparent conductive film} = \text{Haze value of a substrate together with the transparent conductive film formed thereon} - \text{Haze value of only the substrate} \quad \text{[Equation 4]}$$

Example 2

Formulation of the Coating Liquid 9.6 g of the liquid A and 0.4 g of the liquid B of Example 1 were agitated well until they become uniform, thereby formulating a coating liquid for forming transparent conductive film containing 10 weight % of indium acetylacetonate and tin acetylacetonate in total and 1 weight % of hydroxypropylcellulose.

[Fabrication of the Transparent Conductive Film]

Except for using this coating liquid for forming transparent conductive film, the same procedure as that of Example 1 was performed, thereby fabricating a dried coating film (film thickness: 560 nm), an inorganic film (film thickness: 125 nm, surface resistivity: 3×10$^{12}$ Ω/sq), and a transparent conductive film (film thickness: 93 nm) according to Example 2. Note that the substrate temperature reached 260° C. during microwave plasma processing (maximum reached temperature=260° C.)

Various characteristics the fabricated transparent conductive film were measured in the same manner as that of Example 1, and the results is shown in Table 1.

Figure 18:
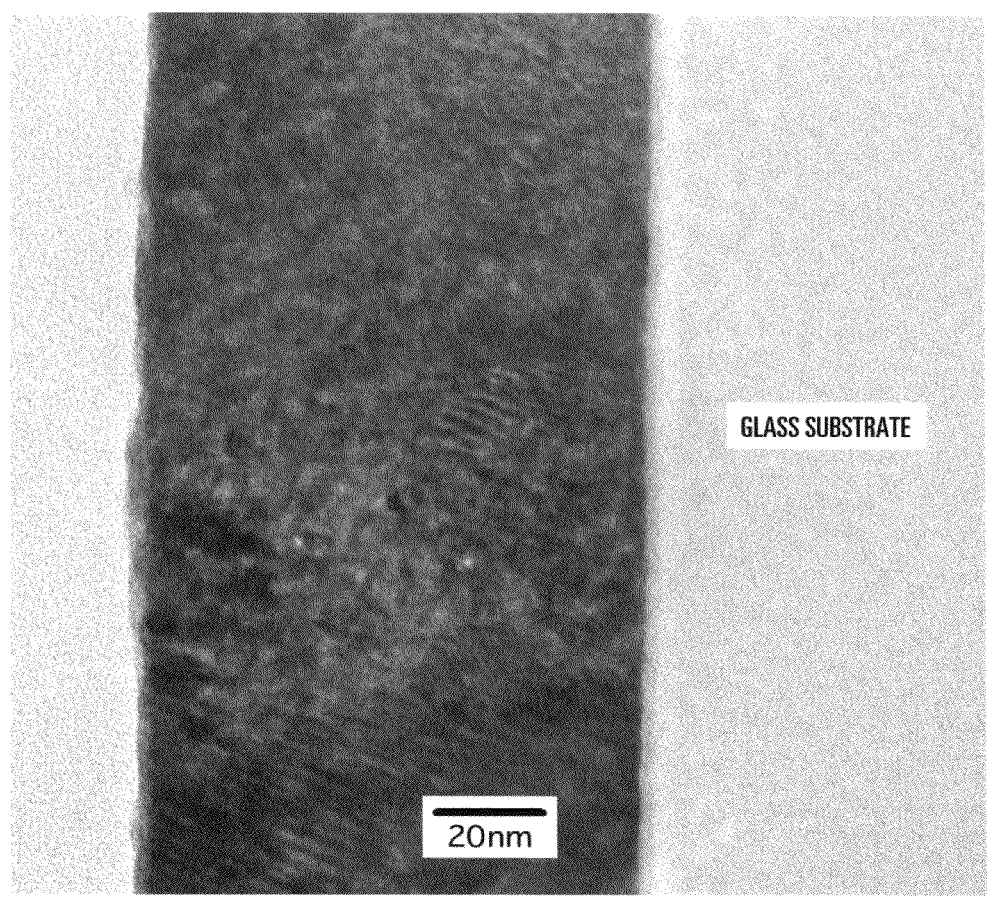
FIG. 18 is a transparent electron microscope photograph (a TEM image) of a cross section of the transparent conductive film according to Example 2.
Figure 19:
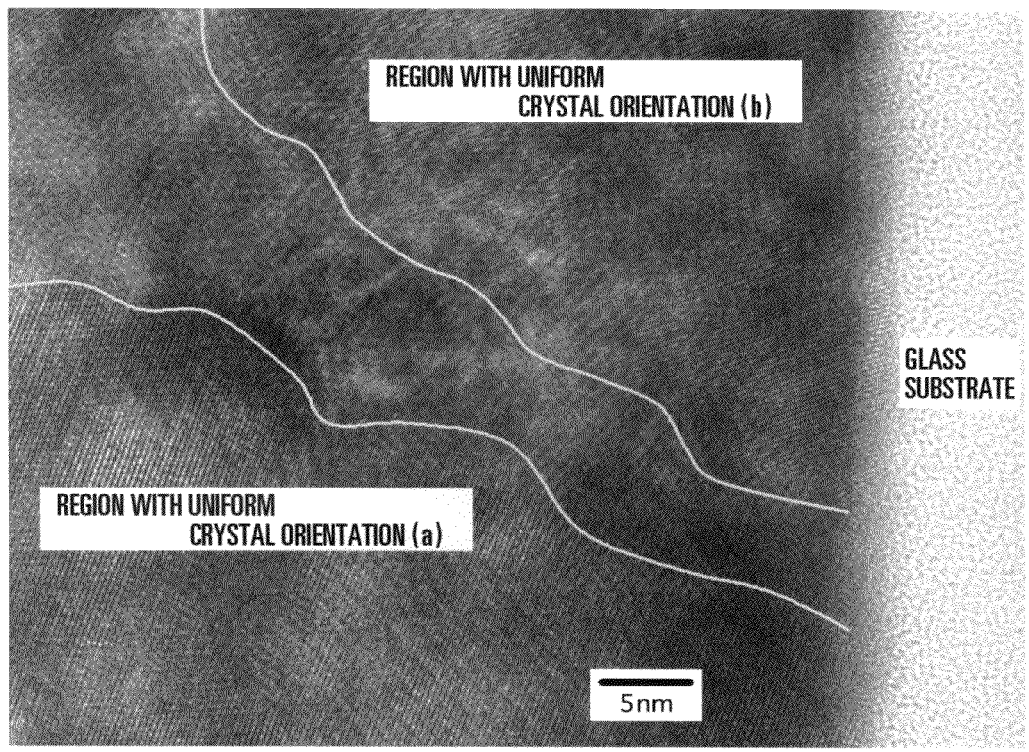
FIG. 19 is a transparent electron microscope photograph (a TEM image) of a partially-enlarged cross section of the transparent conductive film according to Example 2.
Figure 20:
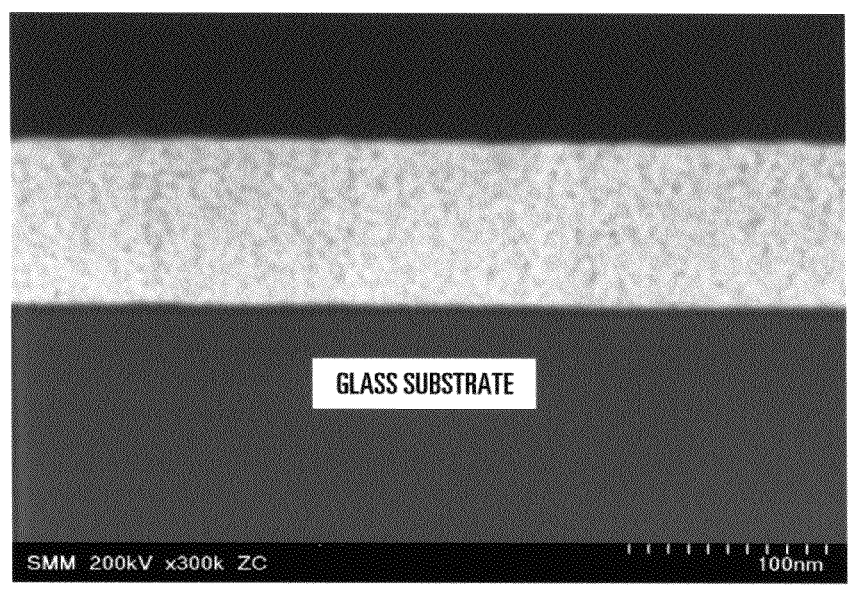
FIG. 20 is a Z contrast image of a cross section of the transparent conductive film according to Example 2.

Furthermore, transmission electron microscope photographs (TEM images) of a cross section and a partial cross section of the transparent conductive film of Example 2 observed by a transmission electron microscope are shown in FIG. 18 and FIG. 19, respectively. Also, a Z contrast image of the cross section of the transparent conductive film of Example 2 observed by the transmission electron microscope is shown in FIG. 20. In the Z contrast image, heavy elements are shown as bright, and therefore an ITO portion appears bright.

From FIG. 18 to FIG. 20, it can be found that the transparent conductive film is configured of a conductive oxide fine-particle layer densely packed with conductive oxide fine particles formed with ITO microcrystals on the order of 5 nm to 20 nm, the layer also having a special structure with regions (oriented regions) where crystal orientation of these conductive oxide fine particles being adjacent to each other.

This film structure is considered to be formed in a manner such that, in crystallization and crystal growth of the film by the action of plasma of the microwave plasma processing (the crystallization promoting effect), crystal particles are first formed on a film surface and, at the same time, crystallization and crystal growth proceed from the film surface to a substrate side via contact portions between the crystal particles.

Note that, in regions (a) and (b) in FIG. 19, since a portion of the sample with a thickness of approximately 100 nm was cut out for TEM image observation, there are portions in that thickness where ITO microcrystals of different crystal orientations are overlaid with each other. In these portions, moire fringes due to interference are observed.

Example 3

Formulation of the Coating Liquid 9.9 g of the liquid A and 0.1 g of the liquid B of Example 1 were agitated well until they become uniform, thereby formulating a coating liquid for forming transparent conductive film containing 10 weight % of indium acetylacetonate and tin acetylacetonate in total and 1 weight of hydroxypropylcellulose.

[Formulation of the Transparent Conductive Film]

Except for using this coating liquid for forming transparent conductive film, the same procedure as that of Example 1 was performed, thereby fabricating a dried coating film (film thickness: 510 nm, surface resistivity: $>1\times10^{13}$ Ω/sq [insulated state]), an inorganic film (film thickness: 120 nm, surface resistivity: $1\times10^{12}$ Ω/sq), and a transparent conductive film (film thickness: 92 nm) according to Example 3. Note that the substrate temperature reached 260° C. during microwave plasma processing (maximum reached temperature=260° C.)

Various characteristics the fabricated transparent conductive film were measured in the same manner as that of Example 1, and the results is shown in Table 1.

Figure 21:
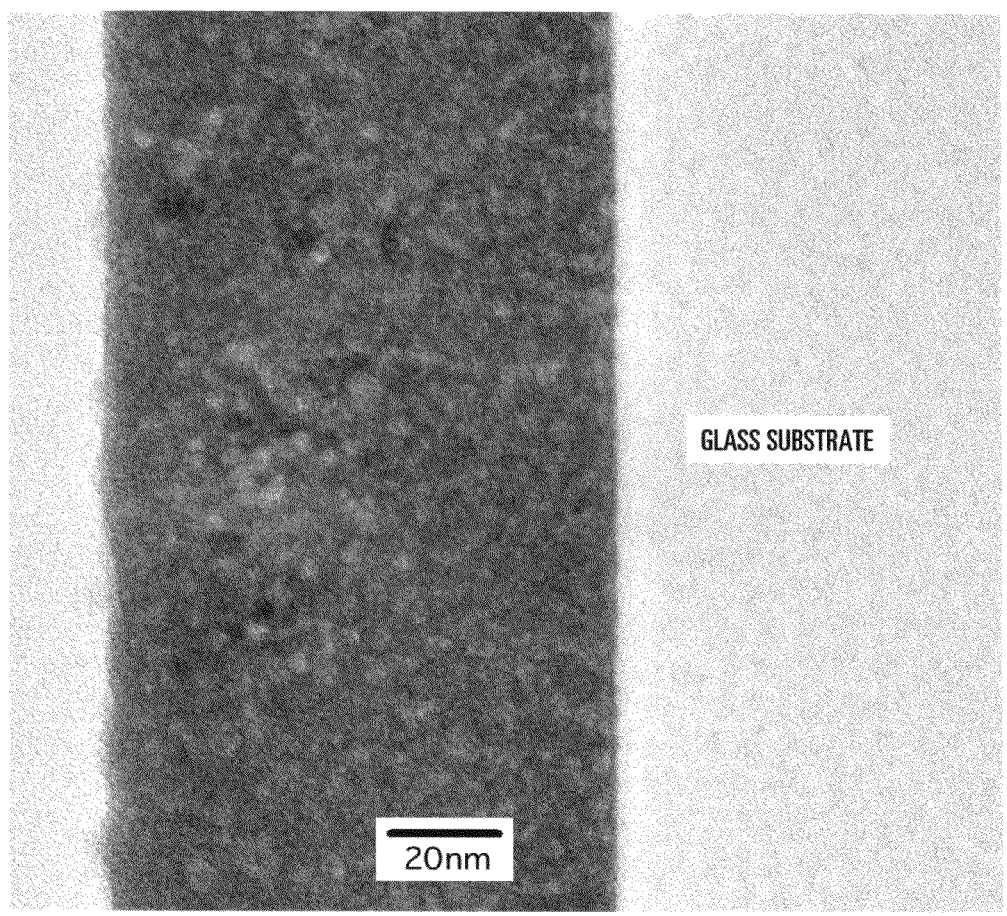
FIG. 21 is a transparent electron microscope photograph (a TEM image) of a cross section of the transparent conductive film according to Example 3.
Figure 22:
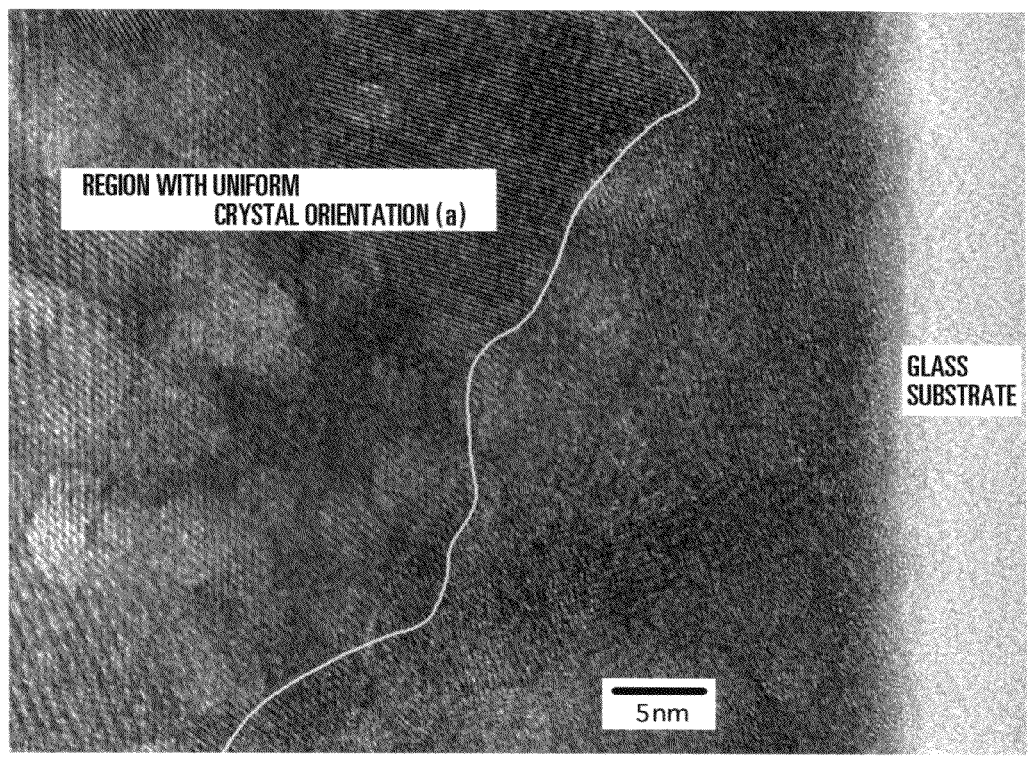
FIG. 22 is a transparent electron microscope photograph (a TEM image) of a partially-enlarged cross section of the transparent conductive film according to Example 3.
Figure 23:
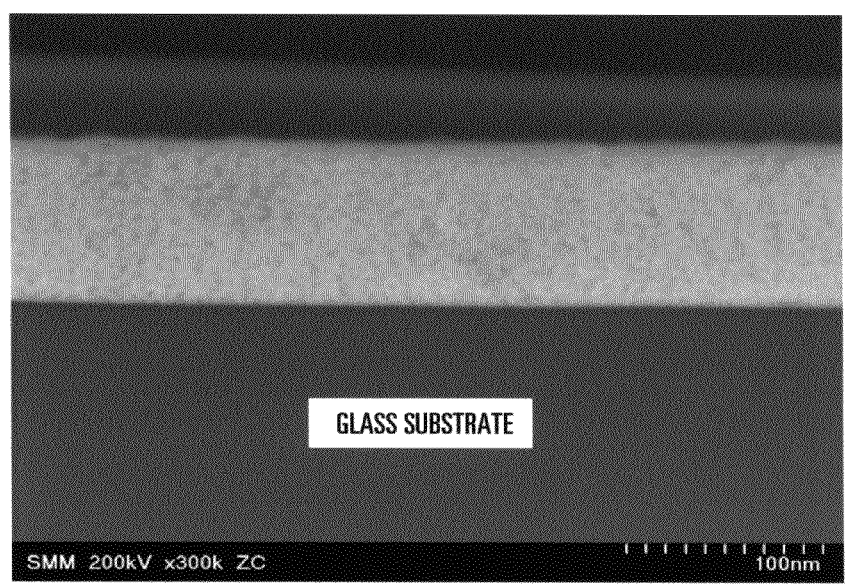
FIG. 23 is a Z contrast image of a cross section of the transparent conductive film according to Example 3.

Furthermore, transmission electron microscope photographs (TEM images) of a cross section and a partial cross section of the transparent conductive film of Example 3 observed by a transmission electron microscope are shown in FIG. 21 and FIG. 22, respectively. Also, a Z contrast image of the cross section of the transparent conductive film of Example 3 observed by the transmission electron microscope is shown in FIG. 23. In the Z contrast image, heavy elements are shown as bright, and therefore an ITO portion appears bright.

As with Example 2, from FIG. 21 to FIG. 23, it can be found that the transparent conductive film is configured of a conductive oxide fine-particle layer densely packed with conductive oxide fine particles formed with ITO microcrystals on the order of 5 nm to 20 nm, the layer also having a special structure with regions (oriented regions) where crystal orientation of these conductive oxide fine particles being adjacent to each other.

Example 4

Formulation of the Transparent Conductive Film

Except for performing microwave plasma processing for fifty seconds, the same procedure as that of Example 2 was performed, thereby fabricating a transparent conductive film (film thickness: 102 nm) according to Example 4. Note that the substrate temperature reached 225° C. during microwave plasma processing (maximum reached temperature=225° C.)

Various characteristics the fabricated transparent conductive film were measured in the same manner as that of Example 1, and the results is shown in Table 1.

Figure 24:
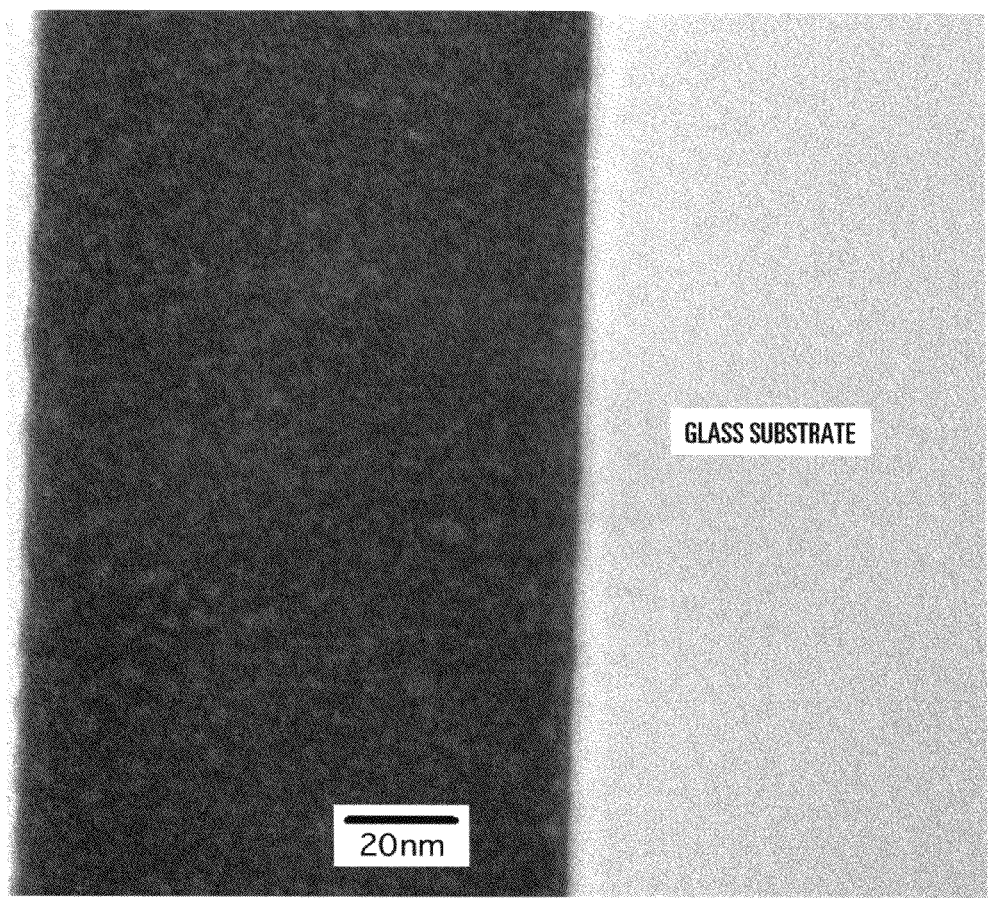
FIG. 24 is a transparent electron microscope photograph (a TEM image) of a cross section of the transparent conductive film according to Example 4.
Figure 25:
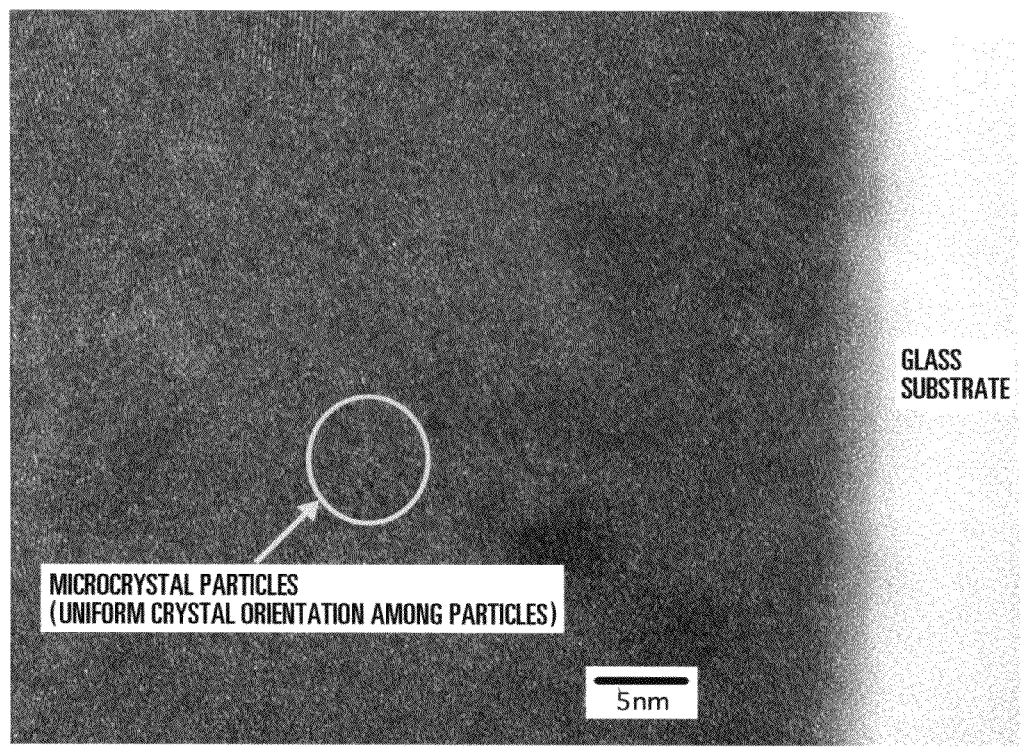
FIG. 25 is a transparent electron microscope photograph (a TEM image) of a partially-enlarged cross section of the transparent conductive film according to Example 4.
Figure 26:
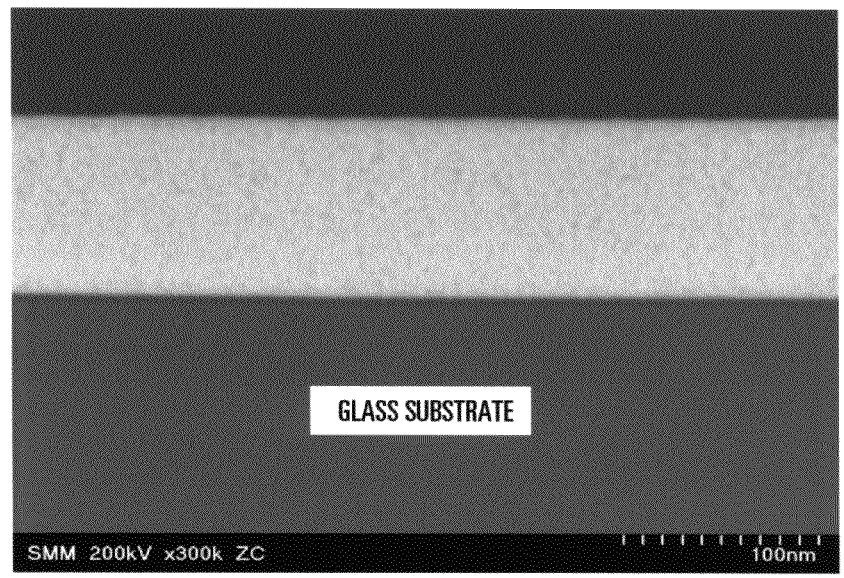
FIG. 26 is a Z contrast image of a cross section of the transparent conductive film according to Example 4.

Furthermore, transmission electron microscope photographs (TEM images) of a cross section and a partial cross section of the transparent conductive film of Example 4 observed by a transmission electron microscope are shown in FIG. 24 and FIG. 25, respectively. Also, a Z contrast image of the cross section of the transparent conductive film of Example 4 observed by the transmission electron microscope is shown in FIG. 26. In the Z contrast image, heavy elements are shown as bright, and therefore an ITO portion appears bright.

From FIG. 24 to FIG. 26, it can be found that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Example 5

Formulation of the Transparent Conductive Film

Except for performing microwave plasma processing for fifty seconds, the same procedure as that of Example 3 was performed, thereby fabricating a transparent conductive film (film thickness: 92 nm) according to Example 5. Note that the substrate temperature reached 225° C. during microwave plasma processing (maximum reached temperature=225° C.)

Various characteristics the fabricated transparent conductive film were measured in the same manner as that of Example 1, and the results is shown in Table 1.

Furthermore, when a cross section of the transparent conductive film of Example 5 was observed by a transmission electron microscope, it was found from its transmission electron microscope photograph (TEM image) and Z contrast image that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Example 6

First, the procedure was performed in the same manner as that of Example 1 to obtain an inorganic film (film thickness: 120 nm, surface resistivity: $5\times10^{12}$ Ω/sq).

Next, as shown in FIG. 8, the ion trap 12 was placed in the chamber 10 to cut ion components in the microwave plasma. Furthermore, the substrate 2 having the inorganic film 7 described above was placed on the heating apparatus (plate heater) 1 for heating the glass substrate. After the inside of the chamber 10 was vacuumized (approximately $10^{-3}$ Pa), while nitrogen gas as an atmospheric gas was being supplied so as to achieve a partial pressure of 5 Pa, microwaves (output: 1000 W) having a frequency of 2450 MHz was introduced from the waveguide 8 via the quartz-made introduction window 9 into the chamber 10 to generate microwave plasma 11 with ion components being cut and containing atomic elements and radical components. Microwave plasma processing was then performed for ten minute (600 seconds) to further promote mineralization of the inorganic film 7 (decomposition or burning of organic components) and also promote a film reducing process (introducing oxygen vacancies into the film) and crystallization, thereby fabricating the transparent conductive film (film thickness: 105 nm) according to Example 6.

Note that the average substrate temperature during the microwave plasma processing described above was 200° C. (in irradiation of the microwave plasma with ion components being cut, the substrate temperature is less prone to increase, and therefore the temperature substrate was controlled by using the heating apparatus described above in a range of 190° C. to 210° C.) Also, in FIG. 8, the distance between the substrate and the quartz-made introduction window was approximately 14 cm.

Next, various characteristics including surface resistivity, haze value, visible light transmittance, transparent conductive film thickness, crystallite size, and pencil hardness of the fabricated transparent conductive film were measured, and the results is shown in Table 1. Furthermore, when a cross section of the transparent conductive film of Example 6 was observed by a transmission electron microscope, it was found from its transmission electron microscope photograph (TEM image) and Z contrast image that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Example 7

First, the procedure was performed in the same manner as that of Example 1 to obtain an inorganic film 7 (film thickness: 120 nm, surface resistivity: $4 \times 10^{12}$ Ω/sq).

Figure 12:
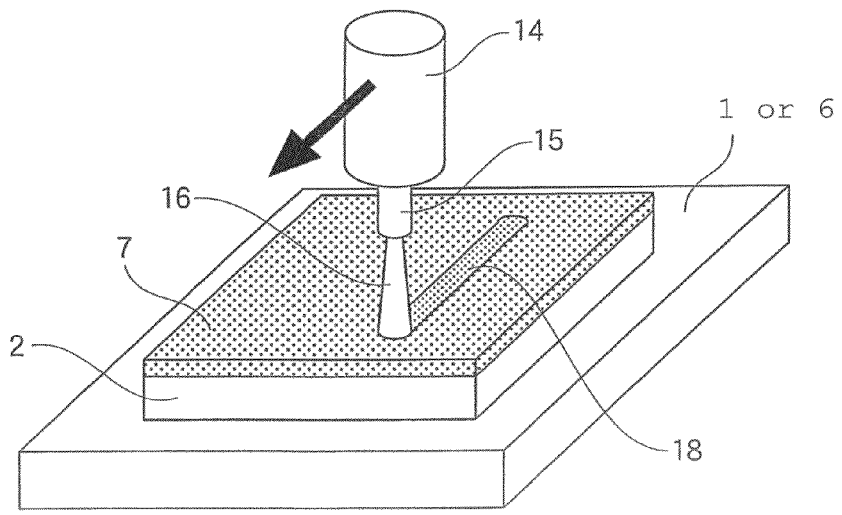
FIG. 12 is a schematic view showing still another example of the atmospheric pressure plasma processing process under the atmospheric non-oxidizing gas atmosphere in the transparent conductive film manufacturing process with the coating method according to the present invention.

Next, as shown in FIG. 12, the substrate 2 having the inorganic film 7 described above was placed on the substrate support plate 6. While nitrogen gas was being supplied at 15 litters/minutes to a plasma generating part of the plasma generating apparatus 14, a microwave plasma was generated by microwaves (output: 150 W) having a frequency of 2450 MHz, and the atmospheric-pressure plasma gas 16 (nitrogen plasma gas) was discharged from the plasma gas discharge nozzle 15 of the plasma generating apparatus 14 described above. With this, the surface of the inorganic film 7 was then sprayed, thereby performing atmospheric-pressure plasma processing on the inorganic film 7. In a portion where the atmospheric-pressure plasma processing was performed, mineralization of the inorganic film 7 (decomposition and burning of organic components) were further promoted, and the film reducing process (introducing oxygen vacancies into the film) proceeded. With this, a transparent conductive film (film thickness: 95 nm) according to Example 7 having the patterned transparent conductive film 18 with a selected portion of the inorganic film (film thickness: 120 nm, surface resistivity: $4 \times 10^{12}$ Ω/sq) subjected to plasma processing was eventually fabricated.

Note that the substrate temperature was 200° C. during the atmospheric-pressure microwave plasma processing described above. Also, in FIG. 12, the distance between the substrate and the tip of the plasma gas discharge nozzle 15 was approximately 5 mm, and the plasma gas discharge nozzle 15 was moved along a straight line at a speed of 240 mm/min so as to obtain a line pattern. The plasma gas 16 discharged from the plasma gas discharge nozzle had a diameter of approximately 2 mm, and the patterned transparent conductive film 18 had a line pattern width of also approximately 2 mm.

Next, various characteristics including surface resistivity, haze value, visible light transmittance, transparent conductive film thickness, crystallite size, and pencil hardness of the fabricated transparent conductive film were measured, and the results is shown in Table 1. Furthermore, when a cross section of the transparent conductive film of Example 7 was observed by a transmission electron microscope, it was found from its transmission electron microscope photograph (TEM image) and Z contrast image that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Example 8

Formulation of Solution Liquid C 40 g of indium acetylacetonate $In(C_5H_7O_2)_3$ (molecular weight=412.15), 43.5 g of p-tert-butylphenol, 14.5 g of dibasic acid ester (manufactured by Du Pont Japan), and 2 g of hydroxypropylcellulose (HPC) were mixed together, heated to 130° C., and agitated for ninety minutes for dissolution. Next, 25 g of the obtained solution, 25 g of cyclohexanone, 10 g of propylene glycol monomethyl ether (PGM), and 40 g of methyl ethyl ketone (MEK) were mixed together and agitated well until they became uniform, thereby formulating an solution (liquid C) containing indium acetylacetonate and hydroxypropylcellulose.

[Formulation of Solution Liquid D]

40 g of tin acetylacetonate (standard nomenclature: di-n-butyl bis(2,4-pentanedionato) tin: $[Sn(C_4H_9)_2\,(C_5H_7O_2)_2]$) (molecular weight=431.14), 43.5 g of p-tert-butylphenol, 14.5 g of dibasic acid ester (manufactured by Du Pont Japan), and 2 g of hydroxypropylcellulose (HPC) were mixed together, heated to 130° C., and agitated for ninety minutes for dissolution. Next, 25 g of the obtained solution, 25 g of cyclohexanone, 10 g of propylene glycol monomethyl ether (PGM), and 40 g of methyl ethyl ketone (MEK) were mixed together and agitated well until they became uniform, thereby formulating an solution (liquid D) containing tin acetylacetonate and hydroxypropylcellulose.

[Formulation of the Coating Liquid]

9.1 g of the formulated liquid C and 0.9 g of the formulated liquid D were agitated well until they become uniform, thereby formulating a coating liquid for forming transparent conductive film containing 10 weight % of indium acetylacetonate and tin acetylacetonate in total and 0.5 weight % of hydroxypropylcellulose.

[Fabrication of the Coating Conductive Film]

With this coating liquid for forming transparent conductive film, spin coating (750 rpm×60 sec) was performed on an entire surface of a no-alkali glass substrate (5 cm×5 cm×thickness of 0.7 mm; visible light transmittance=91.2%, haze value=0.26%) at 25° C., and then the surface was dried in the atmosphere at 150° C. for ten minutes, thereby obtaining a dried coating film (film thickness: 400 nm, surface resistivity: $>1 \times 10^{13}$ Ω/sq [insulated state]).

Next, the substrate 2 having this dried coating film 3 was placed on the hot plate 1 as shown in FIG. 4, and its temperature was increased to 150° C. (temperature increasing speed: 30° C./minute). In the state where 150° C. was kept while low-humidity air having a dew point of −50° C. was being supplied between the ultraviolet ray irradiation window 5 (synthetic quartz plate having a thickness of 2 mm) and the substrate, irradiation of heat energy rays from the low-pressure mercury lamp for twenty minutes was performed to promote mineralization of the dried coating film (decomposition or burning of organic components), thereby obtaining an inorganic film (film thickness: 108 nm, surface resistivity: $4 \times 10^{12}$ Ω/sq).

Note that the irradiation distance between the low-pressure mercury lamp and the substrate was 10.5 mm, illuminance of light of 254 nm was approximately 20 mW/cm$^2$, and estimated illuminance of light of 185 nm was approximately 5 mW/cm$^2$. Furthermore, a space between the substrate and the ultraviolet ray irradiation window 5 was 3.5 mm, and the average velocity of flow of the atmospheric gas (low-humidity air) flowing there between was approximately 0.57 m/sec.

Next, as shown in FIG. 9, the substrate 2 having the inorganic film 7 was placed on the substrate support plate 6 (borosilicate glass having a thickness of approximately 5 mm) in the glass-made chamber 10. After the inside of the chamber 10 was vacuumized (approximately 20 Pa), while 3 volume % hydrogen-97 volume % nitrogen as an atmospheric gas was being supplied (0.16 litters/minute) so as to achieve a partial pressure of 250 Pa, radio-frequency waves (output: 200 W) having a frequency of 13.56 MHz were introduced from the waveguide 8 into the chamber 10 to generate radio-frequency plasma 11. Radio-frequency plasma processing was then performed for 60 minutes to further promote mineralization of the inorganic film 7 (decomposition or burning of organic components) and also promote a film reducing process (introducing oxygen vacancies into the film) and crystallization, thereby fabricating the transparent conductive film (film thickness: 86 nm) according to Example 8. Note that the substrate temperature reached 160° C. during radio-frequency plasma processing (maximum reached temperature=160° C.)

Next, various characteristics including surface resistivity, haze value, visible light transmittance, transparent conductive film thickness, crystallite size, and pencil hardness of the fabricated transparent conductive film were measured, and the results is shown in Table 1.

Furthermore, when a cross section and a partial cross section of the transparent conductive film of Example 8 were observed by a transmission electron microscope, it was found from their transmission electron microscope photographs (TEM image) and Z contrast images that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Example 9

Except for the process operation, as shown in FIG. 6, of performing microwave plasma processing for forty seconds and then cooling (plasma processing time=forty seconds, cooling time=three minutes [forcible cooling to a temperature near room temperature]) three times, the same procedure as that of Example 1 was performed, thereby fabricating a transparent conductive film (film thickness: 101 nm) according to Example 9. Note that the substrate temperature reached 180° C. during microwave plasma processing (maximum reached temperature=180° C.)

Various characteristics the fabricated transparent conductive film were measured in the same manner as that of Example 1, and the results is shown in Table 1.

Furthermore, when a cross section of the transparent conductive film of Example 9 was observed by a transmission electron microscope, it was found from its transmission electron microscope photograph (TEM image) and Z contrast image that the transparent conductive film is configured of a conductive oxide fine-particle layer densely packed with conductive oxide fine particles formed with ITO microcrystals on the order of 5 nm to 10 nm, and ITO microcrystals (amorphous) equal to or smaller than 3 nm mixed together.

Comparative Example 1

In Example 1, microwave plasma processing (one minute in nitrogen) was not performed, and then the dried coating film was irradiated with heat energy rays, thereby obtaining an inorganic film. With this, a transparent conductive film (film thickness: 115 nm) according to Comparative Example 1 was fabricated.

Various characteristics the fabricated transparent conductive film were measured in the same manner as that of Example 1, and the results is shown in Table 1.

Furthermore, when a cross section of the transparent conductive film of Comparative Example 1 was observed by a transmission electron microscope, while mineralization of the film had proceeded, crystallization had not proceed at all, and clear conductive oxide fine particles (ITO microcrystals equal to or larger than 3 nm) were not observed.

Comparative Example 2

In Example 1, heat energy ray irradiation was not performed on the dried coating film, and microwave plasma processing (1.0 minute in nitrogen) was directly performed on the dried coating film. With this, a transparent conductive film (film thickness: 485 nm) according to Comparative Example 2 was fabricated.

Various characteristics the fabricated transparent conductive film were measured in the same manner as that of Example 1, and the results is shown in Table 1.

Furthermore, when a cross section of the transparent conductive film of Comparative Example 2 was observed by a transmission electron microscope, possibly because mineralization of the film (decomposition of an organic substance) had not proceeded, organic components were significantly left, the film was colored with brown, and clear conductive oxide fine particles (ITO microcrystals equal to or larger than 3 nm) were not observed.

Comparative Example 3

Fabrication of the Transparent Conductive Film

The temperature of the substrate having the dried coating film of Example 1 was increased for 35 minutes to 350° C. in an air atmosphere having a dew point of −50° C. (a supply at 1 litter/minute), and was then baked at 350° C. for 15 minutes. As it is, with the atmosphere being changed to 1 volume % hydrogen-99 volume % nitrogen (a supply at 1 litter/minute), the substrate was baked at 350° C. for 15 minutes, thereby fabricating a transparent conductive film (film thickness: 105 nm) according to Comparative Example 3.

Various characteristics the fabricated transparent conductive film were measured in the same manner as that of Example 1, and the results is shown in Table 1.

Furthermore, when a cross section of the transparent conductive film of Comparative Example 3 was observed by a transmission electron microscope, it was found from its transmission electron microscope photograph (TEM image) and Z contrast image that the transparent conductive film is configured of a conductive oxide fine-particle layer densely packed with conductive oxide fine particles formed with ITO microcrystals on the order of approximately 20 nm. The conductive oxide fine particles formed with the ITO microcrystals on the order of approximately 20 nm had random crystal orientations, and no oriented region was formed.

(in particular, the crystallite size is extremely large in Examples 2 and 3 where the content of the tin compound as a dopant metal compound) in the transparent conductive film.

TABLE 1

| | In/Sn RATIO [MOLAR RATIO] | DRYING TEMPERATURE [°C.] | HEAT ENERGY RAY PROCESSING TEMPERATURE [°C.] | PLASMA PROCESSING | | | SURFACE RESISTIVITY [Ω/sq] |
|---|---|---|---|---|---|---|---|
| | | | | TYPE | PRESSURE | PROCESSING TEMPERATURE [°C.] | |
| EXAMPLE 1 | 91.4/8.6 | 150 | 150 | MICROWAVE | 5 Pa | 260 | 240 |
| EXAMPLE 2 | 96.2/3.8 | 150 | 150 | MICROWAVE | 5 Pa | 260 | 175 |
| EXAMPLE 3 | 99.0/1.0 | 150 | 150 | MICROWAVE | 5 Pa | 260 | 240 |
| EXAMPLE 4 | 96.2/3.8 | 150 | 150 | MICROWAVE | 5 Pa | 225 | 650 |
| EXAMPLE 5 | 99.0/1.0 | 150 | 150 | MICROWAVE | 5 Pa | 225 | 480 |
| EXAMPLE 6 | 91.4/8.6 | 150 | 150 | MICROWAVE | 5 Pa | 200 | 800 |
| EXAMPLE 7 | 91.4/8.6 | 150 | 150 | MICROWAVE | ATMOSPHERIC PRESSURE | 200 | 1200 |
| EXAMPLE 8 | 91.4/8.6 | 150 | 150 | RADIO FREQUENCY | 250 Pa | 160 | 750 |
| EXAMPLE 9 | 91.4/8.6 | 150 | 150 | MICROWAVE | 5 Pa | 180 | 630 |
| COMPARATIVE EXAMPLE 1 | 91.4/8.6 | 150 | 150 | — | — | — | $5 \times 10^{12}$ |
| COMPARATIVE EXAMPLE 2 | 91.4/8.6 | 150 | — | MICROWAVE | 5 Pa | 225 | $>1 \times 10^{13}$ |
| COMPARATIVE EXAMPLE 3 | 91.4/8.6 | 150 | — | — | — | — | 223 |

| | VISIBLE LIGHT TRANSMITTANCE [%] | HAZE VALUE [%] | FILM THICKNESS [nm] | CRYSTALLITE SIZE [nm] | PENCIL HARDNESS |
|---|---|---|---|---|---|
| EXAMPLE 1 | 93.7 | 0.37 | 103 | AMORPHOUS | EQUAL TO OR HARDER THAN 5H |
| EXAMPLE 2 | 92.8 | 0.22 | 93 | 46.3 | EQUAL TO OR HARDER THAN 5H |
| EXAMPLE 3 | 92.3 | 0.3 | 92 | 39.1 | EQUAL TO OR HARDER THAN 5H |
| EXAMPLE 4 | 94.6 | 0.44 | 102 | AMORPHOUS | 3H |
| EXAMPLE 5 | 94.3 | 0.36 | 92 | AMORPHOUS | 3H |
| EXAMPLE 6 | 98.1 | 0.19 | 105 | AMORPHOUS | EQUAL TO OR HARDER THAN 5H |
| EXAMPLE 7 | 95.5 | 0.22 | 95 | AMORPHOUS | EQUAL TO OR HARDER THAN 5H |
| EXAMPLE 8 | 93.1 | 0.23 | 86 | AMORPHOUS | EQUAL TO OR HARDER THAN 5H |
| EXAMPLE 9 | 92.7 | 0.27 | 101 | AMORPHOUS | EQUAL TO OR HARDER THAN 5H |
| COMPARATIVE EXAMPLE 1 | 96.2 | 0.39 | 115 | AMORPHOUS | SOFTER THAN H |
| COMPARATIVE EXAMPLE 2 | 96.5 | 1.22 | 485 | AMORPHOUS | SOFTER THAN H |
| COMPARATIVE EXAMPLE 3 | 98.4 | 0.05 | 105 | 19.5 | EQUAL TO OR HARDER THAN 5H |

Figure 27:
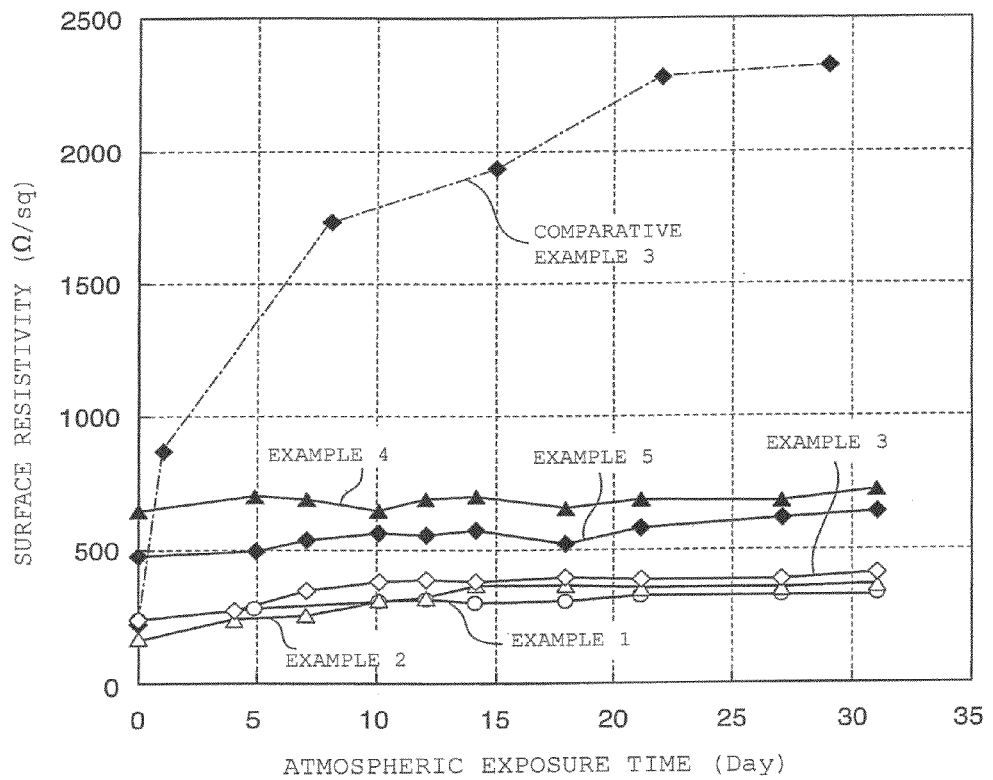
FIG. 27 is a drawing that shows changes with time in surface resistivity of the transparent conductive films of Examples 1 to 5 and Comparative Example 3 as being exposed in the atmosphere.
Figure 28:
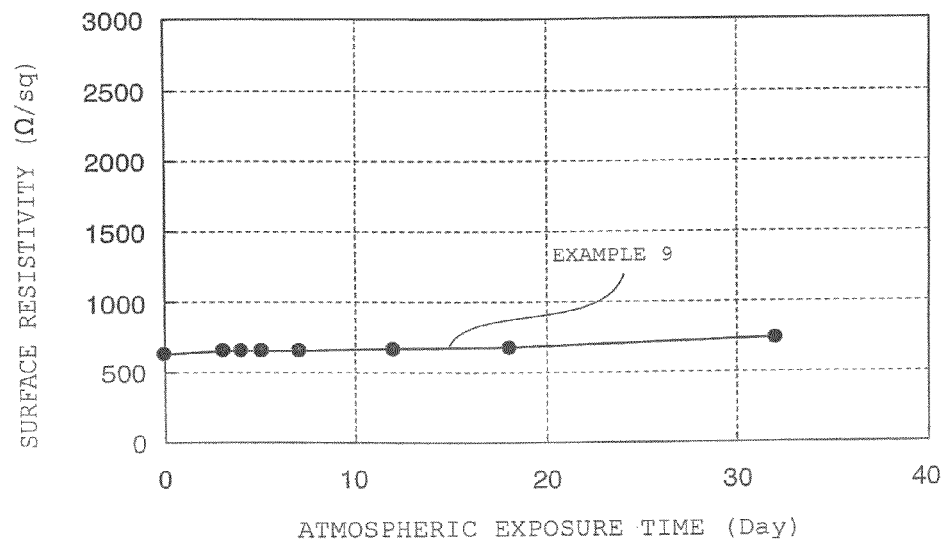
FIG. 28 is another drawing that shows changes with time in surface resistivity of a transparent conductive film of Example 9 as being exposed in the atmosphere.

Furthermore, stability of resistance values was evaluated for each of the transparent conductive films of Examples 1 to 5 and Comparative Example 3, and the results are shown in FIG. 27. Similarly, the results obtained by conducting an evaluation on Example 9 are shown in FIG. 28.

The evaluations of stability of the resistance value are represented by examining changes with in surface resistivity, with substrates having the transparent conductive films according to Examples 1 to 5 and Example 9 and a substrate having the transparent conductive film according to Comparative Example 3 being exposed indoors (in the atmosphere) at a temperature of 23° C. to 25° C. and a relative humidity of 50% to 70% for approximately one month.

When each of the Examples (Examples 1 to 9) and Comparative Examples 1 and 2 described above are compared with each other, the following can be found. In each of the Examples, mineralization occurs and crystal grow proceeds The transparent conductive film has a conductive oxide fine-particle layer densely packed with conductive oxide fine particles, has a high resistance value of 175 Ω/sq to 1200 Ω/sq (it reads ohm per square), and is excellent in film strength (pencil hardness). By contrast, in Comparative Examples 1 and 2, the films are amorphous transparent films not sufficiently being mineralized or crystallized, and therefore each have a low conductivity, with their resistance values being 5×1012 Ω/sq and >1×1013 Ω/sq, respectively, and each have a significantly low film strength (pencil hardness).

Note that while the films are all amorphous from the crystallite sizes found by X-ray diffraction measurements in Example 1, Examples 4 to 9, Comparative Example 1, and Comparative Example 2, ITO microcrystals of 5 nm to 10 nm are observed from the TEM images in Example 1 and Examples 4 to 9, while ITO microcrystals equal to or larger than 3 nm are not observed from the TEM images in Comparative Examples 1 and 2.

On the other hand, ITO microcrystals on the order of 5 nm to 20 nm are observed from the TEM images in Examples 2 and 3, while the crystallite sizes found by X-ray diffraction measurements are extremely large, 46.3 nm and 39.1 nm, respectively. As described above, it can be found that the conductive oxide fine particles are oriented with the same crystal orientation.

It can also be found that while the film in each Examples is the transparent conductive film mineralized where crystallization proceeds and is densified as having a film thickness 86 nm to 105 nm, the film in Comparative Example 2 is a transparent conductive film not sufficiently mineralized, having a thick thickness of 485 nm and not being densified.

Furthermore, when each of the Examples and Comparative Example 3 are compared with each other, it can be found that while a transparent conductive film with high conductivity and excellent in film strength is obtained from each of these Examples and Comparative Example 3, the film forming process temperatures (maximum reached temperatures of the substrates through all of the film formation processes) of the Examples are low, 160° C., 180° C., 225° C., or 260° C., respectively, but the film forming process temperature of Comparative Example 3 is extremely high, 350° C.

Still further, the crystal growth promoting effect of the plasma processing reinforces the bonds of the contact portions between the conductive oxide fine particles in Examples 1 to 5 and Example 9. Therefore, when the transparent conductive film is left indoors (in the atmosphere) with a relative humidity of 50% to 70% at a temperature of 23° C. to 25° C. for approximately one month, their resistance values are extremely stable. By contrast, in Comparative Example 3, it can be found that since the film is formed with conventional simple heating and baking and the bonds of the contact portions between the conductive oxide fine particles are not reinforced, while the initial resistance value of the transparent conductive film is low, degradation with time occurs to a degree approximately ten times larger than the initial resistance value.

The transparent conductive film according to the present invention can be formed on a substrate by using any of various inexpensive coating methods with heating at a low temperature lower than 300° C., in particular, 100° C. to 250° C., with a simple manner at low cost. The obtained transparent conductive film has both of excellent transparency and high conductivity and also is excellent in film strength and resistance stability. Therefore, a transparent conductive substrate having this transparent conductive film formed on the substrate can be expected to used for a transparent electrode of light-emitting devices such as an LED element, an electroluminescent lamp (an electroluminescent element), and a field emission lamp; electric power generating devices such as a solar cell; display devices such as a liquid-crystal display (a liquid-crystal element), an electroluminescent display, a plasma display, and an electric paper element; and input devices such as a touch panel.

In addition, a conductive oxide fine-particle layer densely packed with conductive oxide fine particles having the metal oxide described above as a main component has a high degree of density, thus can increase carrier mobility, and is suitable for a conductive oxide film (oxide semiconductor film) as a channel active layer of a thin-film transistor.

What is claimed is:

1. A method of manufacturing a transparent conductive film to be formed through following steps:
coating a substrate with a coating liquid containing an organometallic compound to form a coating film;
drying the coating film to form a dried coating film;
irradiating the dried coating film with energy rays while heating the dried coating film under an oxygen-containing atmosphere having a dew-point temperature equal to or lower than −10° C. to a heating temperature less than 300° C. thereby removing an organic component contained in the dried coating film by decomposition and/or burning, thereby forming an inorganic film having an inorganic component, which is a metal oxide; and then
plasma processing on the inorganic film under a non-oxidizing gas atmosphere at a substrate temperature less than 300° C. to further promote mineralization or crystallization of the film, thereby forming a conductive oxide fine-particle layer densely packed with conductive oxide fine particles, wherein
the organometallic compound is formed from any one or more of an organic indium compound, an organic tin compound, and an organic zinc compound, and
the metal oxide is any one or more of indium oxide, tin oxide, and zinc oxide.

2. The method of manufacturing a transparent conductive film of claim 1:
wherein the coating liquid for forming transparent conductive film contains the organometallic compound and a dopant organometallic compound;
wherein the inorganic component is a metal oxide containing a dopant metal compound; and
wherein the conductive oxide fine-particle layer densely packed with conductive oxide fine particles contains the dopant metal compound and the metal oxide.

3. The method of manufacturing the transparent conductive film according to claim 2, wherein
a content ratio between the organometallic compound and the dopant organometallic compound is in a range of 99.9:0.1 to 66.7:33.3 in terms of a molar ratio of the organometallic compound the dopant organometallic compound.

4. The method of manufacturing the transparent conductive film according to claim 2, wherein
the organometallic compound is an organic indium compound, and
the dopant organometallic compound is selected from the group consisting of an organic tin compound, an organic titanium compound, an organic germanium compound, an organic zinc compound, an organic tungsten compound, an organic zirconium compound, an organic tantalum compound, an organic niobium compound, an organic hafnium compound, and an organic vanadium compound, and the dopant metal compound is any one or more of tin oxide, titanium oxide, germanium oxide, zinc oxide, tungsten oxide, zirconium oxide, tantalum oxide, niobium oxide, hafnium oxide, vanadium oxide, and a mixture thereof.

5. The method of manufacturing the transparent conductive film according to claim 2, wherein
the organometallic compound is an organic tin compound, and
the dopant organometallic compound is selected from the group consisting of an organic indium compound, an organic antimony compound, an organic phosphorus compound, and a mixture thereof.

6. The method of manufacturing the transparent conductive film according to claim 2, wherein
the organometallic compound is an organic zinc compound, and
the dopant organometallic compound is selected from the group consisting of an organic aluminum compound, an organic indium compound, an organic gallium compound, and a mixture thereof.

7. The method of manufacturing the transparent conductive film according to any one of claim 1 or 2, wherein
the plasma processing is low-pressure plasma processing to be performed under a decompressed non-oxidizing gas atmosphere.

8. The method of manufacturing the transparent conductive film according to claim 7, wherein
the low-pressure plasma processing is low-pressure microwave plasma processing or low-pressure radio-frequency plasma processing.

9. The method of manufacturing the transparent conductive film according to claim 7, wherein
the decompressed non-oxidizing gas atmosphere is an atmosphere containing any one or more of nitrogen gas, inert gas, and reducing gas and has an atmospheric gas pressure of 2 Pa to 1000 Pa.

10. The method of manufacturing the transparent conductive film according to claim 7, wherein
in the low-pressure plasma processing, the substrate is heated to the substrate temperature lower than 300° C. and, simultaneously, ions in low-pressure plasma are cut and the inorganic film is irradiated mainly with radical components.

11. The method of manufacturing the transparent conductive film according to any one of claim 1 or 2, wherein
the plasma processing is atmospheric-pressure plasma processing to be performed under a non-oxidizing gas atmosphere with an atmospheric pressure.

12. The method of manufacturing the transparent conductive film according to claim 11, wherein
the atmospheric-pressure plasma processing is atmospheric-pressure microwave plasma processing or atmospheric-pressure radio-frequency plasma processing.

13. The method of manufacturing the transparent conductive film according to claim 11, wherein
the non-oxidizing gas atmosphere with the atmospheric pressure is an atmosphere containing any one or more of nitrogen gas, inert gas, and reducing gas.

14. The method of manufacturing the transparent conductive film according to any one of claim 1 or 2, wherein
the plasma processing step is a step of selectively performing the plasma processing on only part of the inorganic film formed in the heat energy ray irradiating step to form a patterned conductive oxide fine-particle layer, and by the step, a patterned transparent conductive film is formed.

15. The method of manufacturing the transparent conductive film according to any one of claim 1 or 2, wherein
subsequently to the energy ray irradiation under the oxygen-containing atmosphere while heating to the heating temperature lower than 300° C. and the plasma processing at the substrate temperature lower than 300° C., heating is performed under a neutral atmosphere or a reducing atmosphere at a heating temperature lower than 300° C.

16. The method of manufacturing the transparent conductive film according to claim 15, wherein
the neutral atmosphere is an atmosphere containing any one or more of nitrogen gas or inert gas, or the reducing atmosphere is an hydrogen gas atmosphere or an atmosphere containing at least one or more of hydrogen gas or organic solvent vapor in the neutral atmosphere.

17. The method of manufacturing the transparent conductive film according to any one of claim 1 or 2, wherein
the energy ray irradiation under the oxygen-containing atmosphere while heating to the heating temperature lower than 300° C. and the plasma processing at the substrate temperature lower than 300° C. are respectively energy ray irradiation under the oxygen-containing atmosphere while heating to a heating temperature of 100° C. to 250° C. and a plasma processing at a substrate temperature of 100° C. to 250° C.

18. The method of manufacturing the transparent conductive film according to any one of claim 1 or 2, wherein
the energy ray irradiation is irradiation of ultraviolet rays containing at least a component having a wavelength equal to or smaller than 200 nm as a main component.

19. The method of manufacturing the transparent conductive film according to claim 18, wherein
the irradiation of the ultraviolet rays containing at least the component having the wavelength equal to or smaller than 200 nm as the main component is irradiation of ultraviolet rays emitted from any of a low-pressure mercury lamp, an amalgam lamp, or an excimer lamp.

20. The method of manufacturing the transparent conductive film according to any one of claim 1 or 2, wherein the organic indium compound is indium acetylacetonate.

21. The method of manufacturing the transparent conductive film according to claim 1, wherein
the coating of the substrate with the coating liquid for forming transparent conductive film in the coating step is performed by a method which is any of an inkjet printing method, a screen printing method, a gravure printing method, an offset printing method, a flexor printing method, a dispenser printing method, a slit coat method, a die coat method, a doctor blade coat method, a wire bar coat method, a spin coat method, a dip coat method, or a spray coat method.

* * * * *